US008451789B2

(12) United States Patent
Junell et al.

(10) Patent No.: US 8,451,789 B2
(45) Date of Patent: May 28, 2013

(54) METHOD TO REQUEST RESOURCES IN TV WHITE SPACES TYPE ENVIRONMENT

(75) Inventors: Jari Henrik Junell, Espoo (FI); Mika Kasslin, Espoo (FI); Juha Salokannel, Tampere (FI)

(73) Assignee: Nokia Corporation, Espoo (FI)

( * ) Notice: Subject to any disclaimer, the term of this patent is extended or adjusted under 35 U.S.C. 154(b) by 396 days.

(21) Appl. No.: 12/815,620

(22) Filed: Jun. 15, 2010

(65) Prior Publication Data
US 2011/0305206 A1 Dec. 15, 2011

(51) Int. Cl.
*H04W 4/00* (2009.01)

(52) U.S. Cl.
USPC .......................................... 370/329; 370/310

(58) Field of Classification Search
USPC ..................... 455/63.1, 67.11, 69, 114.2, 313, 455/447, 515, 509, 522, 517; 370/250, 208, 370/252, 254, 260, 280, 281, 310, 328, 329, 370/330; 375/130, 295, 260
See application file for complete search history.

(56) References Cited

U.S. PATENT DOCUMENTS

| | | | |
|---|---|---|---|
| 7,826,459 B2 | 11/2010 | Xhafa et al. | |
| 7,983,216 B2 | 7/2011 | Iyer et al. | |
| 8,165,106 B2 | 4/2012 | Yang et al. | |
| 2005/0027871 A1 | 2/2005 | Bradley et al. | |
| 2006/0002326 A1 | 1/2006 | Vesuna | |
| 2006/0034217 A1 | 2/2006 | Kwon et al. | |
| 2006/0286986 A1 | 12/2006 | Kim et al. | |
| 2007/0086426 A1 | 4/2007 | Bonta et al. | |
| 2007/0135162 A1 | 6/2007 | Banerjea et al. | |
| 2007/0161364 A1 | 7/2007 | Surineni et al. | |
| 2007/0254596 A1 | 11/2007 | Corson et al. | |
| 2008/0043705 A1 | 2/2008 | Desai et al. | |
| 2008/0089279 A1 | 4/2008 | Hu et al. | |

(Continued)

FOREIGN PATENT DOCUMENTS

| | | |
|---|---|---|
| EP | 1863303 A1 | 12/2007 |
| EP | 1 883 258 | 1/2008 |

(Continued)

OTHER PUBLICATIONS

Junnel et al. (Coexistence for Unlicensed Spectrum Users in White Spaces), Mar. 2010, IEEE, pp. 1-5.*

(Continued)

*Primary Examiner* — Abdullah Riyami
(74) *Attorney, Agent, or Firm* — Locke Lord LLP

(57) ABSTRACT

Method, apparatus, and computer program product embodiments are disclosed for independent wireless resource sharing on a fair basis to enable selecting the most suitable coexistence between wireless networks. Example embodiments of the invention include a hierarchical resource request process that enables reallocation of radio resources in a coexistence band. When new resources are requested by a network, a search is made for free resources in the coexistence band. If this does not succeed, a check is made for any allocated but unused resources in the coexistence band that have been advertised by neighboring networks. If there are insufficient advertised resources, then the allocation of resources in neighboring networks is analyzed and compared with the requesting network's need for network resources. There are two graduated stages to the analysis. In an example light analysis stage, an analysis of the allocation of resources is limited to neighboring networks within the same network allocation group as the requesting network's. In a more extensive analysis stage, all of the neighboring networks are analyzed. In this manner, a more complete resource reallocation may be achieved.

30 Claims, 25 Drawing Sheets

U.S. PATENT DOCUMENTS

| | | | |
|---|---|---|---|
| 2008/0108365 A1 | 5/2008 | Buddhikot et al. | |
| 2008/0137627 A1 | 6/2008 | Fischer et al. | |
| 2008/0159258 A1 | 7/2008 | Ji et al. | |
| 2008/0228878 A1 | 9/2008 | Wu et al. | |
| 2008/0233875 A1 | 9/2008 | Desai et al. | |
| 2008/0253341 A1 | 10/2008 | Cordeiro et al. | |
| 2008/0261639 A1* | 10/2008 | Sun et al. | 455/515 |
| 2008/0268892 A1* | 10/2008 | Hamdi et al. | 455/522 |
| 2008/0285525 A1 | 11/2008 | Hu | |
| 2008/0298310 A1 | 12/2008 | Hu | |
| 2009/0040937 A1 | 2/2009 | Xhafa et al. | |
| 2009/0059856 A1 | 3/2009 | Kermoal et al. | |
| 2009/0122755 A1 | 5/2009 | Seok et al. | |
| 2009/0149208 A1 | 6/2009 | Huttunen et al. | |
| 2009/0196180 A1* | 8/2009 | Bahl et al. | 370/235 |
| 2009/0197627 A1 | 8/2009 | Kuffner et al. | |
| 2009/0225717 A1 | 9/2009 | Banerjea | |
| 2009/0247201 A1 | 10/2009 | Ye et al. | |
| 2009/0279449 A1 | 11/2009 | Kneckt et al. | |
| 2009/0279491 A1 | 11/2009 | Kim et al. | |
| 2009/0298522 A1 | 12/2009 | Chaudhri et al. | |
| 2010/0002608 A1* | 1/2010 | Goldhamer | 370/280 |
| 2010/0046440 A1 | 2/2010 | Singh | |
| 2010/0087216 A1 | 4/2010 | Ko et al. | |
| 2010/0091731 A1 | 4/2010 | Kim et al. | |
| 2010/0097950 A1 | 4/2010 | Jeon | |
| 2010/0097952 A1 | 4/2010 | McHenry et al. | |
| 2010/0142463 A1* | 6/2010 | Hu | 370/329 |
| 2010/0220687 A1 | 9/2010 | Reznik et al. | |
| 2010/0232380 A1 | 9/2010 | Choi et al. | |
| 2010/0248631 A1 | 9/2010 | Chaudhri et al. | |
| 2010/0273426 A1 | 10/2010 | Walley et al. | |
| 2010/0304685 A1 | 12/2010 | Wietfeldt et al. | |
| 2010/0309806 A1 | 12/2010 | Wu et al. | |
| 2011/0090887 A1 | 4/2011 | Kim et al. | |
| 2011/0090890 A1 | 4/2011 | Seok et al. | |
| 2011/0116488 A1 | 5/2011 | Grandhi | |
| 2011/0179174 A1 | 7/2011 | Kasslin et al. | |
| 2011/0199989 A1 | 8/2011 | Wietfeldt et al. | |
| 2011/0222493 A1* | 9/2011 | Mangold et al. | 370/329 |
| 2011/0243094 A1 | 10/2011 | Dayal et al. | |
| 2011/0250857 A1* | 10/2011 | Reial et al. | 455/114.2 |
| 2011/0250921 A1* | 10/2011 | Reial | 455/517 |
| 2011/0287802 A1 | 11/2011 | Ma et al. | |
| 2011/0310767 A1 | 12/2011 | Hu | |
| 2012/0069746 A1 | 3/2012 | Park | |
| 2012/0077506 A1* | 3/2012 | Wietfeldt et al. | 455/450 |
| 2012/0094681 A1 | 4/2012 | Freda et al. | |
| 2012/0106512 A1 | 5/2012 | Banerjea et al. | |
| 2012/0127011 A1 | 5/2012 | Lee et al. | |
| 2012/0134328 A1 | 5/2012 | Gauvreau et al. | |
| 2012/0182883 A1 | 7/2012 | Junell et al. | |
| 2012/0195269 A1 | 8/2012 | Kang et al. | |
| 2012/0225662 A1* | 9/2012 | Jo et al. | 455/447 |

FOREIGN PATENT DOCUMENTS

| | | |
|---|---|---|
| EP | 2083591 A1 | 7/2009 |
| GB | 2461724 A | 1/2010 |
| WO | 03/001742 A1 | 1/2003 |
| WO | 2005/045689 A2 | 5/2005 |
| WO | 2006/132487 A1 | 12/2006 |
| WO | 2007/031958 A2 | 3/2007 |
| WO | 2010/027308 A1 | 3/2010 |
| WO | 2010/043270 A1 | 4/2010 |
| WO | WO2011022506 | 2/2011 |

OTHER PUBLICATIONS

Ruuska P. et al. "P802.19 System Architecture", IEEE Mentor, IEEE Standards Association, doc.: IEEE 802.19-10/46r3, Mar. 17, 2010, [online], [retrieved on Dec. 1, 2011]. Retrieved from the Internet: <URL: https://mentor.ieee.org/802.19/documents>.

Harada et al., "Research, Development, and Standards Related Activities on Dynamic Spectrum Access and cognitive Radio", New Frontiers in Dynamic Spectrum, 2010 IEEE Symposium on 20100406, IEEE, Piscataway, NJ, USA.

Akyildiz I. et al., "Next Generation/Dynamic Spectrum Access/Cognitive Radio Wireless Networks: A survey", Sep. 15, 2006, Elsevier Science Publishers B.V., Amsterdam, NL, ISSN 1389-1286, pp. 2127-2159.

International Search Report and Written Opinion mailed Dec. 12, 2011 in International Application Serial No. PCT/FI2011/050777, 12pp.

P. Camarda et al., "An Exclusive Self-Coexistence (ESC) Resource Sharing Algorithm for Cognitive 802.22 Networks," 2010 5th International Symposium on Wireless Pervasive Computing (ISWPC), pp. 128-133.

European Search Report dated Jun. 27, 2012 for European Application No. 12155105.5-1525.

J. C. Zuniga, et al; IEEE 802-SG-WhiteSpace-09/0032r4; Media Independent Coexistence; Mar. 11, 2009, p. 1-10.

H. Wang, et al; IEEE 802.19-09/0034r3; Media Independent Coexistence for Devices in White Space; Jul. 10, 2009, p. 1-12.

M. Kasslin; IEEE 802.19-10/0055r02; Wireless Coexistence; System Design Document; Mar. 18, 2010, p. 1-12.

Cavalcanti et al, "IEEE 802.22-07/0121 r1 : Proposed text changes to Section 6.21.2 Self-coexistence in IEEE 802.22/D0.2 Draft Standard" published in Mar. 2007.

Cordeiro et al, "Cognitive PHY and MAC Layers for Dynamic Spectrum Access and Sharing of TV Bands", published by ACM on Aug. 5, 2006.

U.S. Appl. No. 13/417,457, filed Mar. 12, 2012, Kasslin, et al.
U.S. Appl. No. 13/417,653, filed Mar. 12, 2012, Kasslin, et al.
U.S. Appl. No. 13/585,051, filed Aug. 14, 2012, Kasslin, et al.

T. Baykas, et al; IEEE P802.19-10/0055r3 Wireless Coexistence—System Design Document; Mar. 18, 2010, p. 1-15.

M. Rahman; IEEE 802.19-10-0010-00-tvws; Possible Coexistence Cases in TVWS and Topics to be Considered in P802.19.1; Jan. 1, 2009; pp. 1-10.

sg-whitespace-09-0055-00-0000 TV Whitespace Tutorial; Mar. 10, 2009.

U.S. Appl. No. 13/100,734, filed May 5, 2011, Jari Junell.
U.S. Appl. No. 13/184,643, filed Jul. 18, 2011, Kasslin et al.

International Search Report for International Application No. PCT/FI2011/050591 dated Sep. 28, 2011.

Kasslin et al., "High Level Architecture View", IEEE 802.19-10/0019r0, Feb. 4, 2010, 10 pp.

U.S. Appl. No. 13/006,857, filed Jan. 14, 2011, Junell et al.
U.S. Appl. No. 13/006,802, filed Jan. 14, 2011, Junell et al.
U.S. Appl. No. 12/875,187, filed Sep. 3, 2010, Junell et al.
U.S. Appl. No. 12/875,183, filed Sep. 3, 2010, Junell et al.
U.S. Appl. No. 13/041,613, filed Mar. 7, 2011, Kasslin et al.
U.S. Appl. No. 12/915,141, filed Oct. 29, 2010, Kasslin et al.
U.S. Appl. No. 12/915,154, filed Oct. 29, 2010, Kasslin et al.
U.S. Appl. No. 13/019,615, filed Feb. 2, 2011, Junell et al.

International Search Report and Written Opinion mailed Jul. 29, 2011 in International Application Serial No. PCT/FI2011/050266, 13pp.

J. Junell, et al.; IEEE P802.19, Wireless Coexistence, Proposal on coexistence system services and protocols; Nov. 7, 2010, XP002681996; pp. 1-46.

J. Junell, et al.; Coexistence for unlicensed spectrum users in white spaces; Applied Sciences in Biomedical and Communication Technologies (ISABEL); 3rd International Symposium on, IEEE; Nov. 7, 2010, pp. 1-5.

Extended European Search Report dated Aug. 30, 2012 for EP Application No. 12162039.7-1525.

Dong Heon Lee et al., "Self-coexistence techniques for cognitive radio LANs/PANs", 21st Annual IEEE International Symposium on Personal Indoor and Mobile Radio Communications (PIMRC), Sep. 26, 2010, IEEE, Piscataway, NJ, USA, pp. 1516-1520, Chapter III B.

Ashraf, I. et al., "Impact of Interfering Bluetooth Piconets on a Collocated p-Persistent CSMA-Based WLAN", IEEE Transactions on Vehicular Technology, vol. 58, No. 9, Jan. 11, 2009, pp. 4962-4975.

Asterjadhi, A. et al., "JENNA: A jamming Evasive Network-Coding Neighbor-Discovery Algorithm for Cognitive radio Networks", IEEE Wireless Communications, vol. 17, No. 4, Jan. 8, 2010, pp. 24-32.

Baykas, T., et al., "Overview of TV White Spaces: Current regulations, standards and coexistence between secondary users", 2010 IEEE 21st International Symposium on Personal, Indoor and Mobile Radio Communications Workshops (PIMRC Workshops), Sep. 26-30, 2010, Istanbul, Turkey, IEEE, Piscataway, NJ, USA, pp. 38-43.

Peha, J.M.: "Sharing Spectrum Through Spectrum Policy reform and Cognitive Radio", Proceedings of teh IEEE, vol. 97, No. 4, Jan. 4, 2009, pp. 708-719.

International Search Report mailed Nov. 29, 2011 in International Application Serial No. PCT/FI2011/050714, 13pp.

International Search Report issued Oct. 11, 2011 in International Serial No. PCT/FI2011/050703, 13pp.

Karama Hamdi, et al., "Power Control in Cognitive Radio Systems Based on Spectrum Sensing Side Information", Proc. IEEE International Conference on Communications (ICC'07), pp. 5161-5165, Jun. 2007.

Ian F. Akyildiz, et al. "A Survey on Spectrum Management in Cognitive Radio Networks", IEEE Communications Magazine • Apr. 2008, pp. 40-48.

Dong In Kim, et al., "Joint Rate and Power Allocation for Cognitive Radios in Dynamic Spectrum Access Environment", IEEE Transactions on Wireless Communications, vol. 7, No. 12, Dec. 2008, pp. 5517-5527.

Fabrizio Granelli, et al., "Standardization and Research in Cognitive and Dynamic Spectrum Access Networks: IEEE SCC41 Efforts and Other Activities", IEEE Communications Magazine • Jan. 2010, pp. 71-79.

Zander, "Can We Find (and Use) "Spectrum Holes"? Spectrum Sensing and Spatial Reuse Opportunities in "Cognitive" Radio Systems", Vehicular Technology Conference, 2009. VTC Spring 2009. IEEE 69th, Date: Apr. 26-29, 2009, pp. 1-5.

H. Harada, "Research and development on cognitive and software radio technologies—Devices and hardware platform-General assembly of URSI," Aug. 2008., 4pp.

A. Mody et al., "A Survey of IEEE Standards Supporting Cognitive Radio and Dynamic Spectrum Access" IEEE, 978-1-4244-2677-5/08, pp. 1-7, Nov. 2008.

R. Venkatesha Prasad et al., "Cognitive Functionality in Next Generation Wireless Networks: Standardization Efforts", IEEE Communications Magazine, Apr. 2008, pp. 72-78.

International Search Report for International Application No. 2PCT/FI2012/050522 mailed Sep. 25, 2012.

International Search Report and Written Opinion mailed Mar. 14, 2012 in International Application Serial No. PCT/FI2011/051128, 15pp.

International Search Report and Written Opinion mailed Apr. 2, 2012 in International Application Serial No. PCT/FI2011/051127, 15pp.

P. Camarda et al., "An Exclusive Self-Coexistence (ESC) Resource Sharing Algorithm for Cognitive 802.22 Networks," 2010 5th International Symposium on Wireless Pervasive Computing (ISWPC), pp. 128-133, May 2010.

Mark Cummings, "Perspectives on Architecture for IEEE 802.19.1", Nov. 11, 2010, pp. 1-15.

S. Filin et al., "P802.19.1 General Architecture," IEEE 802.19-10-00007, Jan. 16, 2010, pp. 1-9.

Minnie Ingersoll, "White Spaces Database," IEEE 802.19-09-/0047r0, Jul. 16, 2009, pp. 1-23.

Paine et al., "WhiteSpace Coexistence Use Cases", IEEE P802.19 Wireless Coexistence, IEEE 802.19-09/26r4, Jul. 16, 2009, pp. 1-14.

Chen Sun et al., "TVWS Coexistence Use Cases", IEEE 802.19 DCN 19-10-0008-01-0000, pp. 1-14, Jan. 2010.

IEEE P802.15.2 Draft No. 09; Coexistence of Wireless Personal Area Networks with Other Wireless Devices Operating in Unlicensed Frequency Bands; Mar. 24, 2003, IEEE Inc. Standards.

J. Zhu, et al.,: Multi-Radio Coexistence: Challenges and Opportunities; Proceedings 16th International Conference on Computer Communications and Networks; Aug. 3, 2007, pp. 358-364.

\* cited by examiner

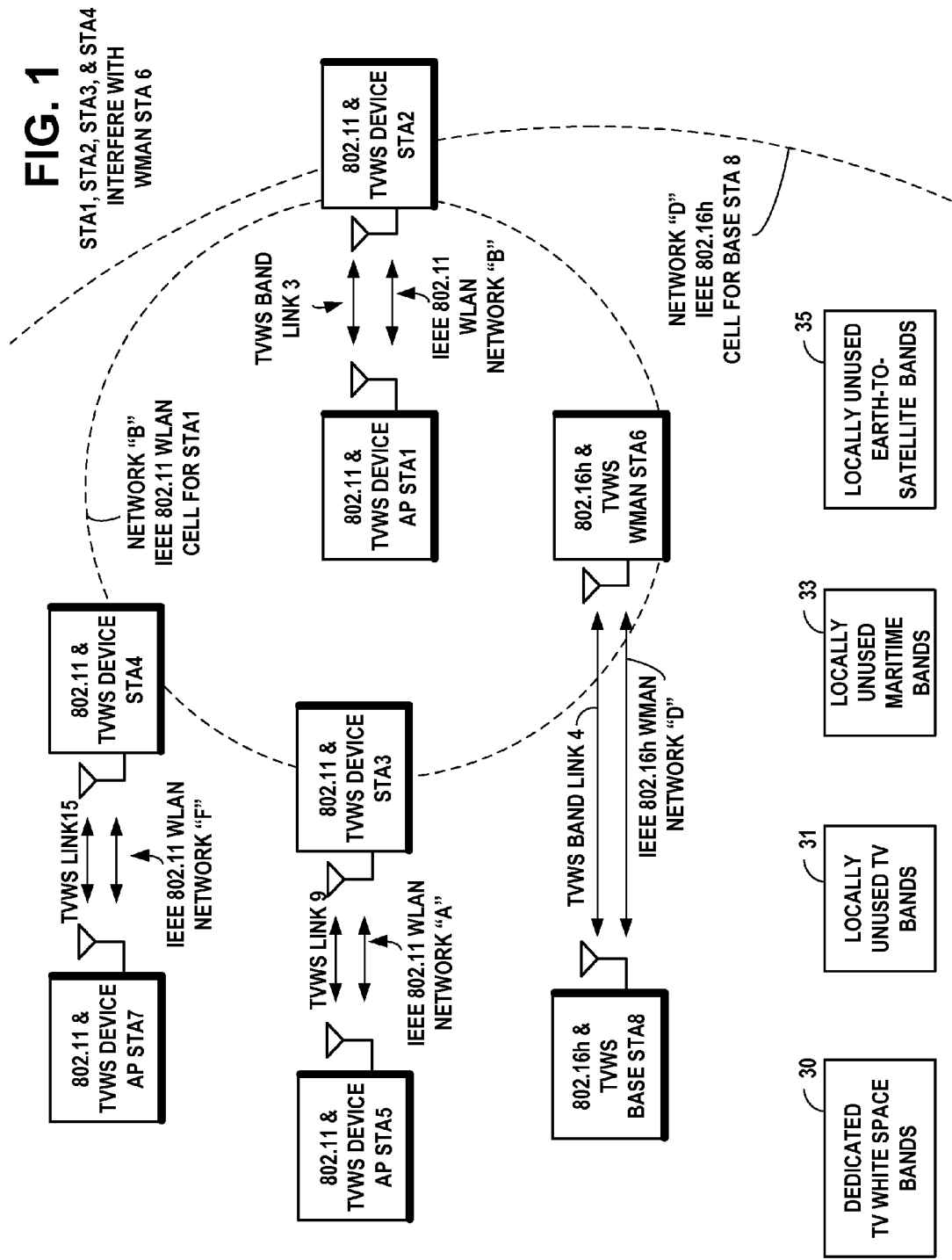

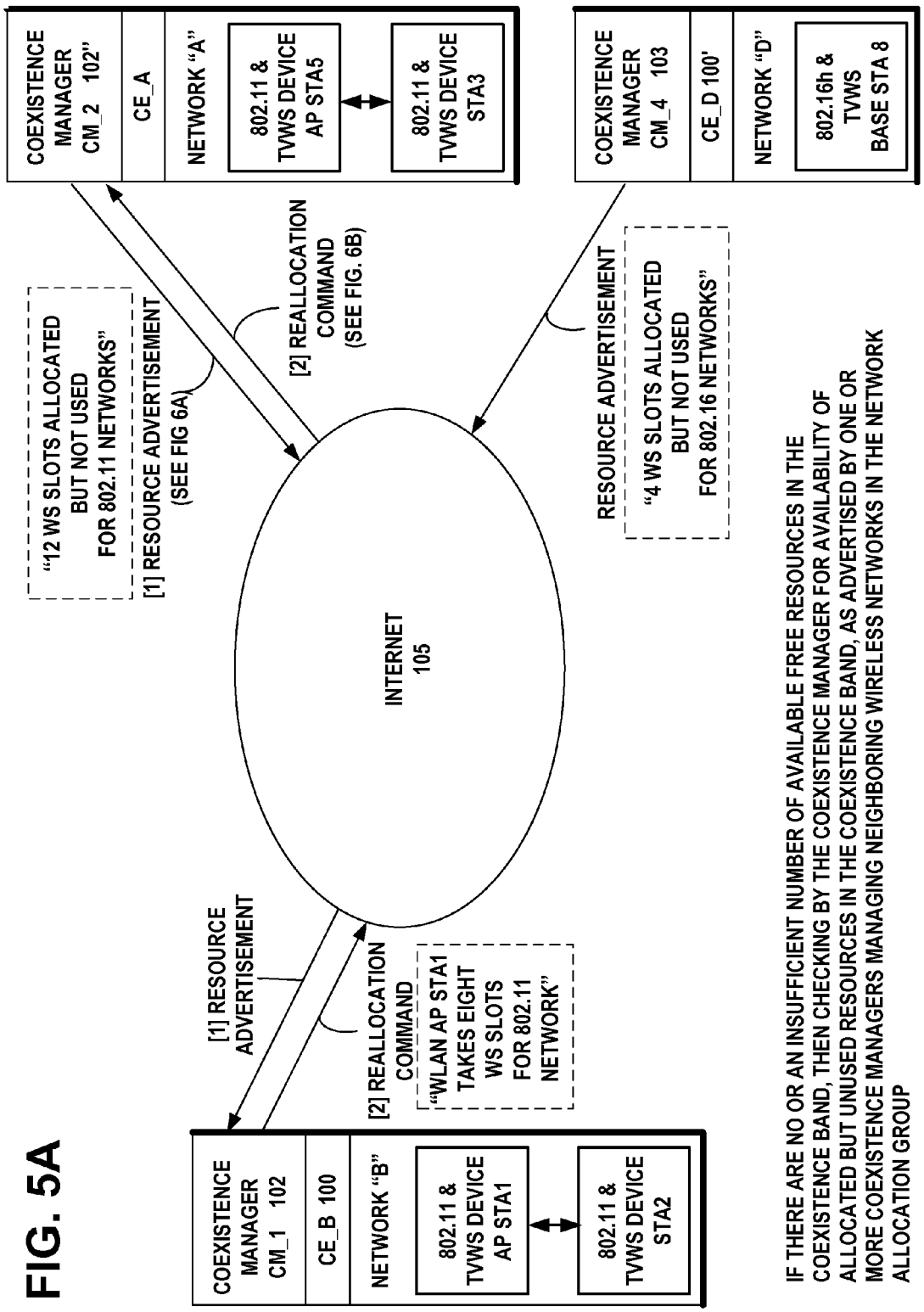

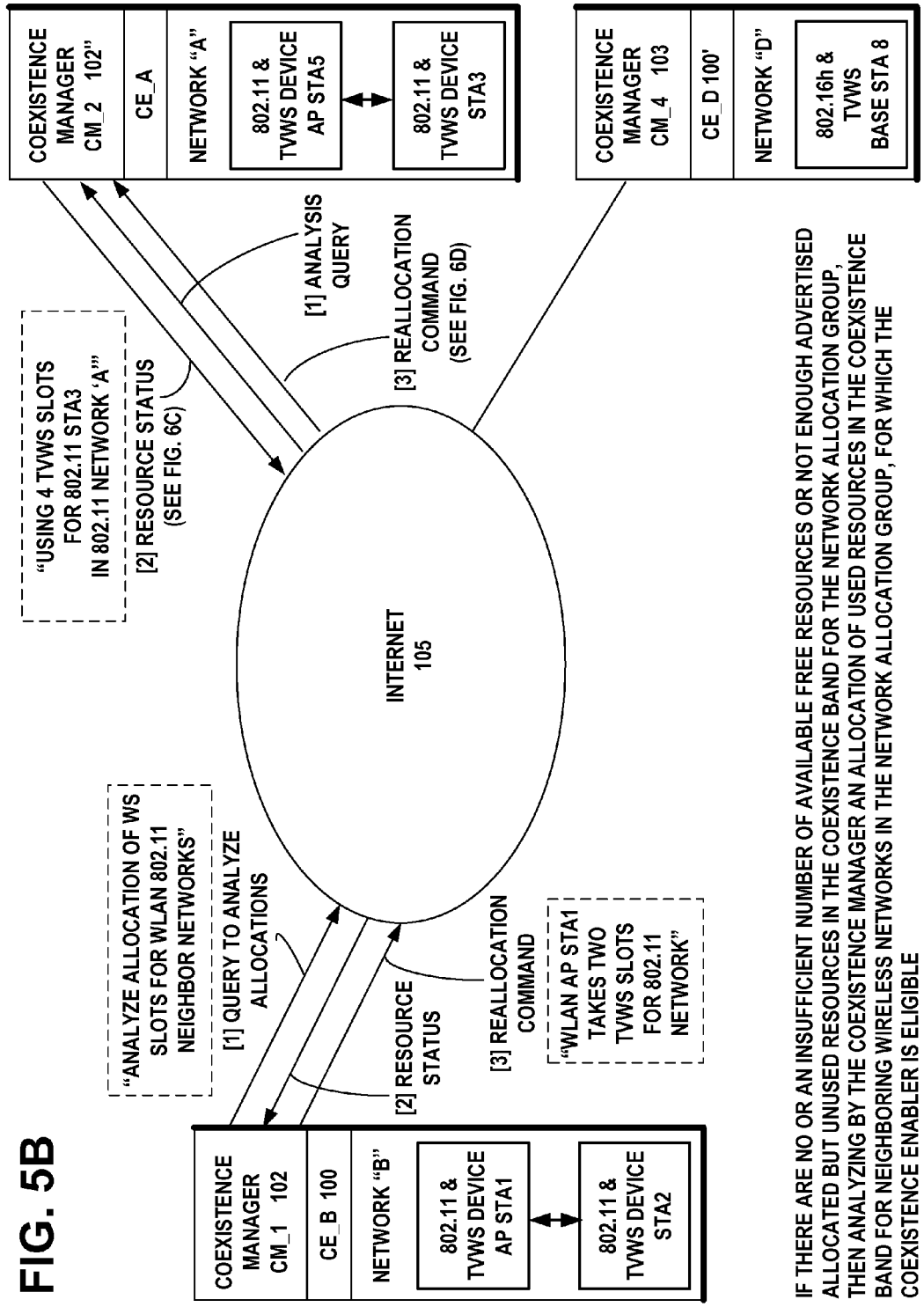

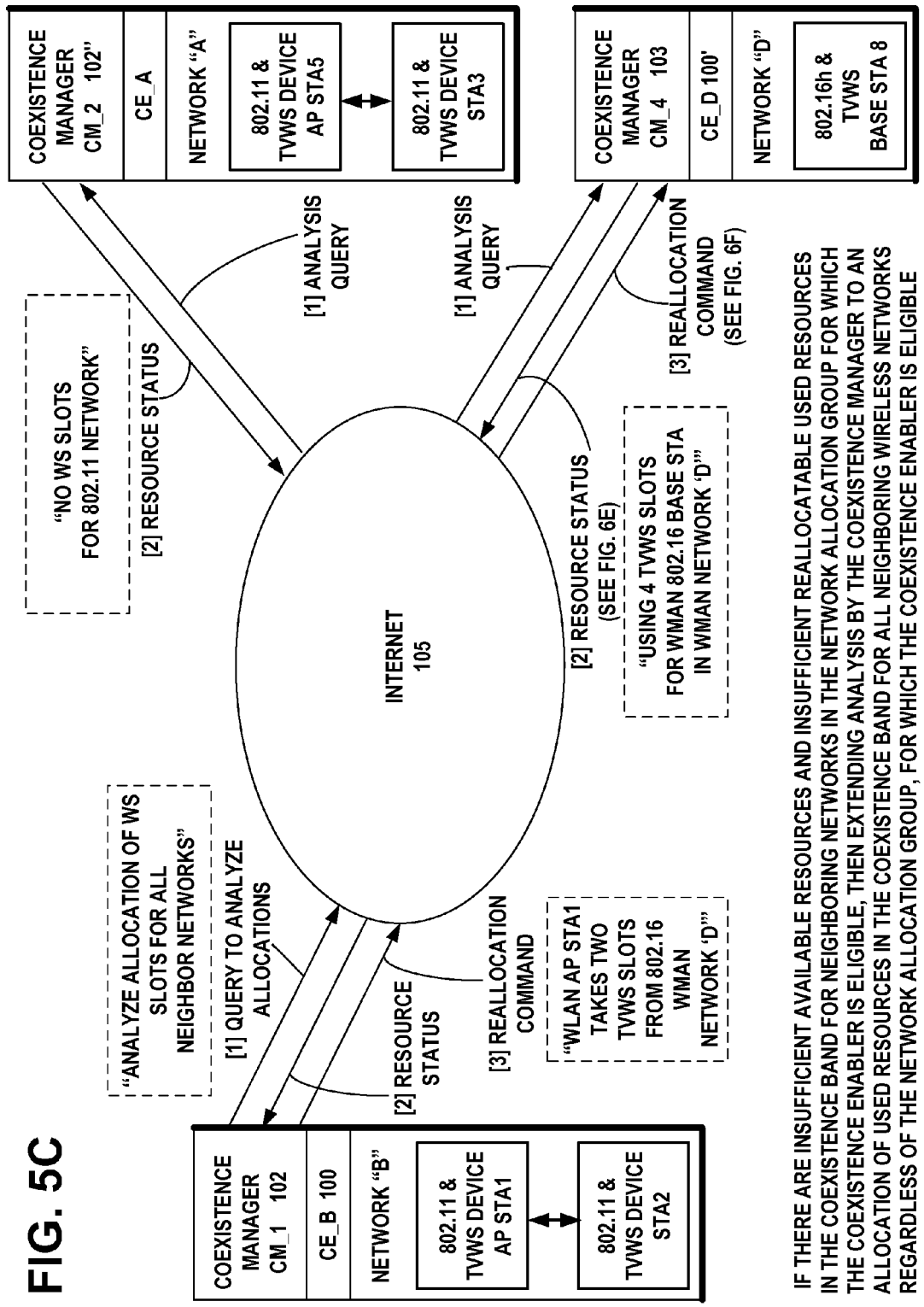

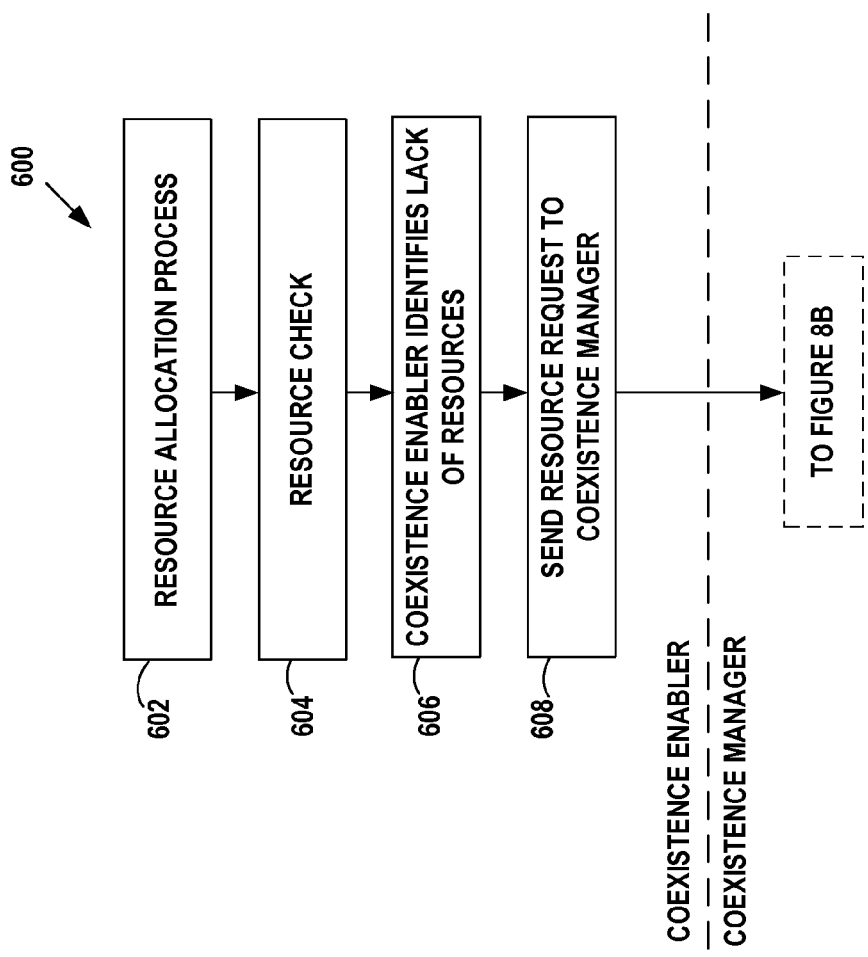
FIG. 8A
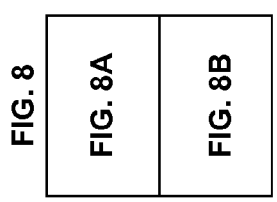

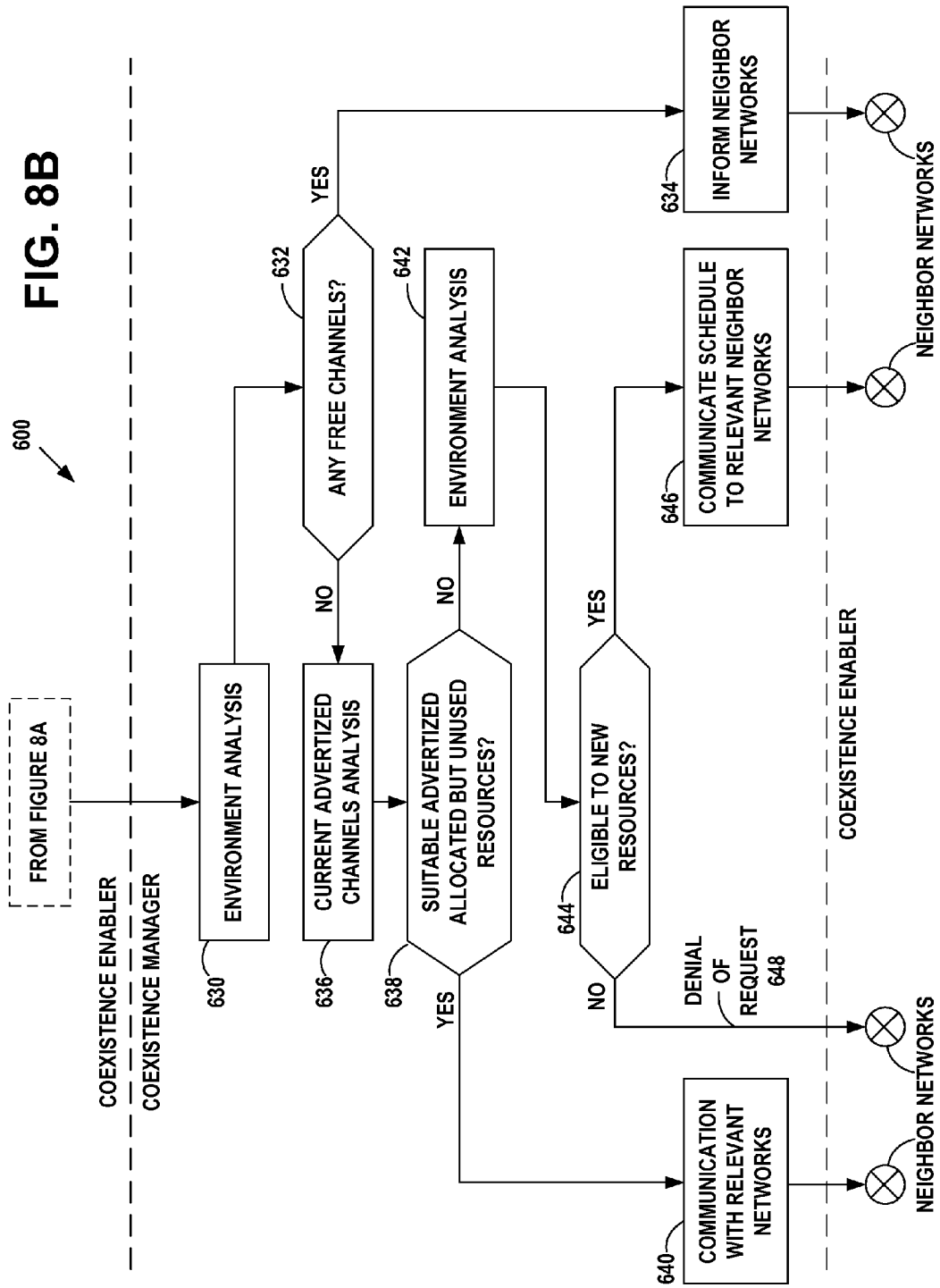

METHOD TO REQUEST RESOURCES IN TV WHITE SPACES TYPE ENVIRONMENT

FIELD

The field of the invention relates to radio coexistence concepts and the utilization of TV white spaces or other RF spectrum white spaces and more particularly, to independent resource sharing on a fair basis to enable selecting the most suitable coexistence between wireless networks.

BACKGROUND

Use of radio frequency bands of the electromagnetic spectrum is regulated by governments in most countries, by allocating specific frequency bands to particular types of uses, such as licensed bands for commercial radio and television broadcasting, cellular telephony, maritime radio, police, fire, and public safety radio, GPS, radio astronomy, earth stations for satellite communications, and many other uses. Governments also allocate unlicensed bands, for example, for Wireless Regional Area Network (WRAN) broadband access for rural areas and wireless local area networks (WLAN) and wireless personal area networks (WPAN), such as the industrial, scientific, and medical (ISM) band.

In the United States, the Federal Communications Commission (FCC) regulates use of the radio spectrum, including radio and television broadcasting. Frequencies are allocated according to a bandplan in which guard bands are assigned between the allocated radio bands to avoid interference between adjacent signals. There are also unassigned frequency bands in the spectrum that either have never been used or have become free as a result of changes in technology. The unassigned frequency bands and guard bands are referred to as white spaces.

TV white space may be broadly defined as broadcast television spectrum that is unused by licensed services. There are at least two categories of TV white space: [1] Dedicated TV white space is a portion of the spectrum that the FCC has reallocated to unlicensed use from previously analog broadcast usage, and [2] Locally unused spectrum by licensed TV broadcasters in a geographic area.

[1] Dedicated TV white space: In the United States, the FCC has dedicated approximately 400 MHz of white spaces for unlicensed use that became unused after a federally mandated transformation of analog TV broadcasting to digital TV broadcasting. However, the FCC has prohibited unlicensed use of white spaces from interfering with existing licensed uses, including digital TV stations, low power TV stations, cable TV headends, and sites where low power wireless microphones are used. Various proposals have been made for unlicensed use of the white spaces left by the termination of analog TV, for example rural broadband deployment, auxiliary public safety communications, educational and enterprise video conferencing, personal consumer applications, mesh networks, security applications, municipal broadband access, enhanced local coverage and communications, fixed backhaul, and sensor aggregation for smart grid meter reading.

[2] Locally unused spectrum by licensed TV broadcasters: The FCC has adopted rules to allow unlicensed radio transmitters to operate in the broadcast television spectrum at locations where that spectrum is not being used by licensed broadcasters. The FCC required the use of geolocation to establish the location of the unlicensed transmitter and a database of TV bands use by licensed broadcasters organized by their geographic coverage areas, to enable the unlicensed transmitter to know where local TV white space bands may be available. The FCC required the use of spectrum sensors in the unlicensed transmitter to detect the presence of the incumbent, primary TV broadcaster's signal in the local TV white space band to enable the unlicensed transmitter to immediately relinquish using the band. A primary user in such a local TV white space band would be an incumbent TV broadcaster licensed to operate in that band, but in those geographic areas where there are no licensed incumbent TV broadcasters in operation, other unlicensed secondary users may make use of that band.

Other RF spectrum white spaces may be locally unused in certain geographic areas, such as the frequency allocations from maritime radio in landlocked areas remote from the sea. A primary user in such a maritime radio band would be a maritime radio licensed to operate in that band, but in those geographic areas where there are no licensed maritime radios in operation, other unlicensed secondary users may make use of that band. Similarly, locally unused RF spectrum white spaces may be present in certain geographic locations, such as the frequency allocations from 2.025 GHz to 2.110 GHz for earth stations to transmit to communications satellites, in areas remote from such earth stations. A primary user in such a satellite earth station radio band would be a satellite earth station licensed to operate in that band, but in those geographic areas where there are no satellite earth stations in operation, other unlicensed secondary users may make use of that band.

Coexistence standards are currently being developed to enable two or more independently operated wireless networks or devices using different radio technologies adapted for TV white space frequency bands, to access the same TV white space frequency band in the same location without mutual interference.

SUMMARY

Method, apparatus, and computer program product embodiments are disclosed for independent wireless resource sharing on a fair basis to enable selecting the most suitable coexistence between wireless networks.

Example embodiments of the invention include a hierarchical resource request process that enables reallocation of radio resources in a coexistence band. When new resources are requested by a network, a search is made for free resources in the coexistence band. If this does not succeed, a check is made for any allocated but unused resources in the coexistence band that have been advertised by neighboring networks. If there are insufficient advertised resources, then the allocation of resources in neighboring networks is analyzed and compared with the requesting network's need for network resources. There are two graduated stages to the analysis. In an example light analysis stage, an analysis of the allocation of resources is limited to neighboring networks within the same network allocation group as the requesting network's. In a more extensive analysis stage, all of the neighboring networks are analyzed. In this manner, a more complete resource reallocation may be achieved.

Example embodiments of the invention include a resource reallocation that enables heterogeneous and unlicensed spectrum users to agree and negotiate on spectrum use to better coexist with each other.

Depending on the wireless environment state, including whether there have been any major changes in the neighborhood of a wireless network after a previous resource allocation, the example network needing more resources may initiate either a light resource request process directed only to the neighboring networks in the same network allocation group or to a more extensive resource request process directed to all networks within interference range. This graduated process brings more stability to the network environment when resource needs are varying.

Example embodiments of the invention enable two or more independently operated wireless networks or devices using different radio technologies adapted for white space frequency bands, to access the same white space frequency band in the same location without mutual interference. Such white space frequency bands include not only FCC dedicated TV white spaces at 54-88 MHz and 470-806 MHz, but also locally unused spectrum by licensed TV broadcasters and other locally unused RF spectrum white spaces that may be present in certain geographic locations, such as frequency allocations for maritime radio in landlocked areas and frequency allocations for satellite earth stations in areas remote from such earth stations.

Example embodiments of the invention include a method, comprising the steps of:

searching for at least one available free resource in a wireless network coexistence band by a coexistence manager, in response to a resource request from a coexistence enabler in a wireless network;

if there are insufficient available free resources in the coexistence band, then checking by the coexistence manager for availability of allocated but unused resources in the coexistence band, as advertised by one or more coexistence managers managing neighboring wireless networks in a network allocation group of the coexistence enabler; and if there are insufficient available free resources or not enough advertised allocated but unused resources in the coexistence band for the network allocation group, then analyzing by the coexistence manager resources and resource needs in the coexistence band for neighboring networks.

Example embodiments of the invention further comprise, if at least one available free resource is found in the coexistence band, then informing coexistence managers managing neighboring wireless networks, of a new resource usage.

Example embodiments of the invention further comprise, if there are allocated but unused resources available, then agreeing with one or more coexistence managers managing neighboring wireless networks to reassign one or more of the available allocated but unused resources in the coexistence band to the coexistence enabler and communicating with coexistence managers managing neighboring wireless networks in the network allocation group.

Example embodiments of the invention further comprise, if the resources or the resource needs have not changed substantially, then making by the coexistence manager a reallocation of used resources in the coexistence band for neighboring wireless networks in the network allocation group.

Example embodiments of the invention further comprise, if the resources or the resource needs have changed, then making by the coexistence manager a reallocation of all available resources in the coexistence band for the neighboring wireless networks.

Example embodiments of the invention further comprise, wherein a change of resources comprises at least one frequency band becoming unavailable or an increase of at least one neighboring network.

Example embodiments of the invention further comprise, if there are no available resources and no reallocatable used resources in the coexistence band for neighboring wireless networks, then indicating by the coexistence manager to the coexistence enabler that the resource request is denied.

Example embodiments of the invention further comprise, if there are reallocatable used resources in the coexistence band for neighboring networks that are in the network allocation group, then agreeing with one or more coexistence managers managing neighboring wireless networks in the same network allocation group, to reassign one or more of the reallocatable used resources to the coexistence enabler and communicating the result of the reassigning with all of the coexistence managers managing neighboring wireless networks in the same network allocation group, if the coexistence enabler is eligible for the reallocatable used resources for networks in the same network allocation group.

Example embodiments of the invention further comprise, if there are reallocatable used resources in the coexistence band for neighboring networks that are not in the same network allocation group, then agreeing with all of the coexistence managers managing neighboring wireless networks, to reassign one or more of the reallocatable used resources to the coexistence enabler and communicating with all of the coexistence managers managing neighboring wireless networks, if the coexistence enabler is eligible for the reallocatable used resources of all of the neighboring networks.

Example embodiments of the invention further comprise, if there are no available resources and no reallocatable used resources in the coexistence band for neighboring wireless networks, then indicating by the coexistence manager to the coexistence enabler that the resource request is denied.

Example embodiments of the invention further include the coexistence band being in a TV white space frequency band.

Example embodiments of the invention further include the coexistence band being in other RF spectrum white space bands besides TV white spaces bands, where a primary user in a particular radio band would be a radio licensed to operate in that band, but in those geographic areas where there may be no licensed radios in operation in that band, other unlicensed secondary users may make use of that band.

Example embodiments of the invention may include a coexistence manager, comprising:

at least one processor;

at least one memory including computer program code;

the at least one memory and the computer program code configured to, with the at least one processor, cause the coexistence manager at least to:

search for at least one available free resource in a wireless network coexistence band by the coexistence manager, in response to a resource request from a coexistence enabler in a wireless network;

if there are insufficient available free resources in the coexistence band, then check by the coexistence manager for availability of allocated but unused resources in the coexistence band, as advertised by one or more coexistence managers managing neighboring wireless networks in a network allocation group of the coexistence enabler; and if there are insufficient available free resources or not enough advertised allocated but unused resources in the coexistence band for the network allocation group, then analyze by the coexistence manager resources and resource needs in the coexistence band for neighboring networks.

Example embodiments of the invention may include a computer readable medium storing program instructions, which when executed by a computer processor, perform the steps comprising:

searching for at least one available free resource in a wireless network coexistence band by a coexistence manager, in response to a resource request from a coexistence enabler in a wireless network;

if there are insufficient available free resources in the coexistence band, then checking by the coexistence manager for availability of allocated but unused resources in the coexistence band, as advertised by one or more coexistence managers managing neighboring wireless networks in a network allocation group of the coexistence enabler; and if there are insufficient available free resources or not enough advertised allocated but unused resources in the coexistence band for the network allocation group, then analyzing by the coexistence manager resources and resource needs in the coexistence band for neighboring networks.

The resulting embodiments provide independent wireless resource sharing on a fair basis to enable selecting the most suitable coexistence between wireless networks.

DESCRIPTION OF THE FIGURES

FIG. 1 is an example system architecture diagram according to an embodiment of the present invention, illustrating a wireless metropolitan area network's coverage area overlapped by a wireless local area network and the reallocation of channels from the wireless local area network to the TV white space band.

FIG. 5A is an example network diagram according to an embodiment of the present invention, illustrating an example of communicating by the coexistence manager 102, with one or more coexistence managers managing neighboring wireless networks, that advertise white space slots allocated but not used in a coexistence band.

FIG. 5B is an example network diagram according to an embodiment of the present invention, illustrating an example of communicating by the coexistence manager 102, with one or more coexistence managers managing neighboring wireless networks belonging to a same network allocation group as the coexistence manager, to analyze the allocation of white space slots for neighbor networks in the same network allocation group.

FIG. 5C is an example network diagram according to an embodiment of the present invention, illustrating an example of communicating by the coexistence manager 102, with all of its coexistence managers managing neighboring wireless networks, to analyze the allocation of white space slots for all neighbor networks.

FIG. 8, consisting of FIGS. 8A and 8B, is an example flow diagram of operational steps in processing a resource request, according to an embodiment of the present invention.

DISCUSSION OF EXAMPLE EMBODIMENTS OF THE INVENTION

Figure 1A:
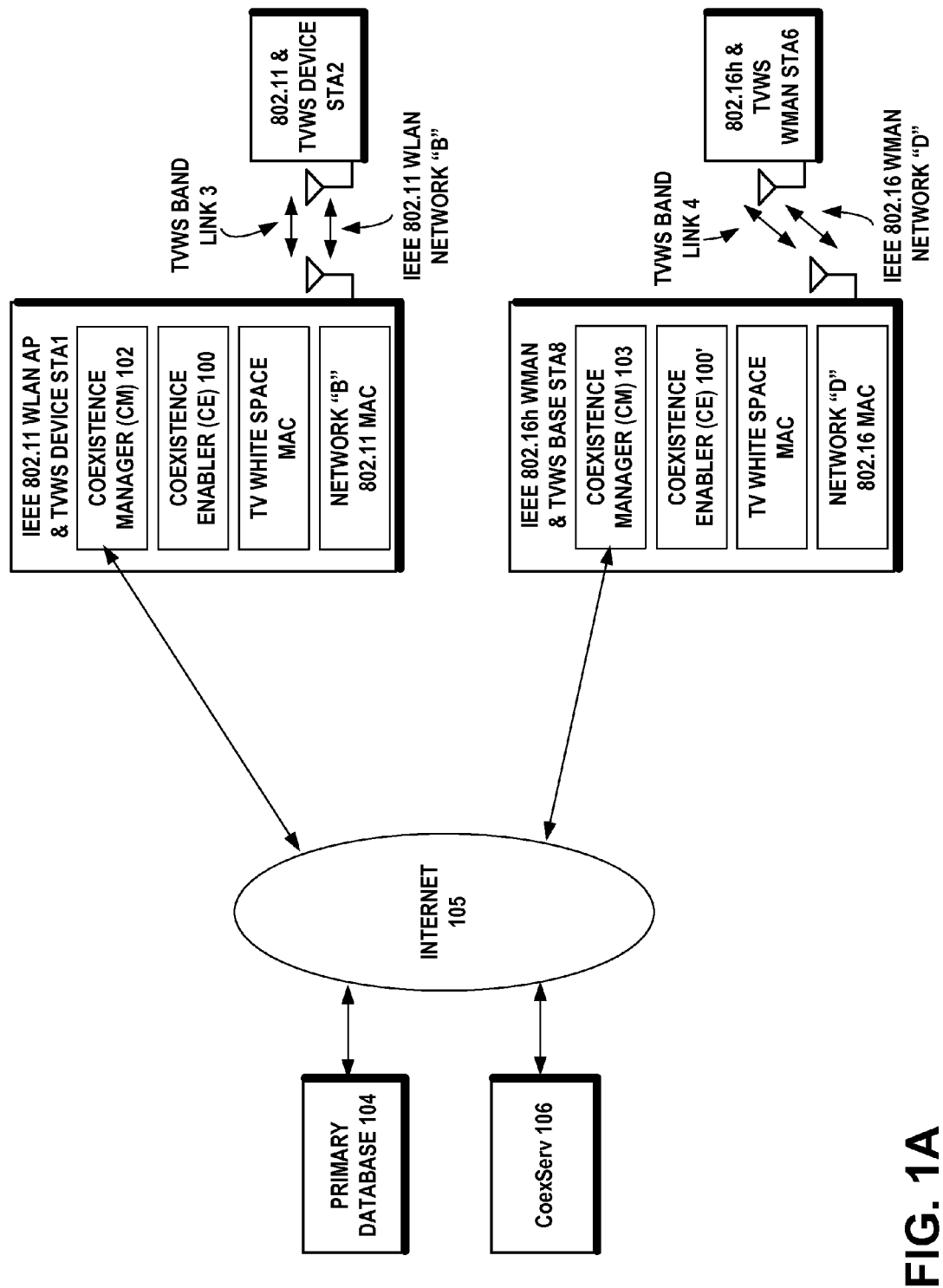
FIG. 1A is an example system architecture according to an embodiment of the present invention, illustrating an example relationship between the coexistence manager, the primary database, and the coexistence network element CoexServ. A network of distributed coexistence managers may communicate with one another over the Internet, in an example embodiment of the invention.

In the United States, the FCC has opened up 300 MHz to 400 MHz of white spaces for unlicensed use that became unused after a federally mandated transformation of analog TV broadcasting to digital TV broadcasting. However, the FCC has prohibited unlicensed use of white spaces from interfering with existing licensed uses, including digital TV stations, low power TV stations, cable TV headends, and sites where low power wireless microphones are used. Various proposals have been made for unlicensed use of the white spaces left by the termination of analog TV, for example rural broadband deployment, auxiliary public safety communications, educational and enterprise video conferencing, personal consumer applications, mesh networks, security applications, municipal broadband access, enhanced local coverage and communications, fixed backhaul, and sensor aggregation for smart grid meter reading.

Coexistence standards are currently being developed to enable two or more independently operated wireless networks or devices using different radio technologies adapted for TV white space frequency bands, to access the same TV white space frequency band in the same location without mutual interference.

The IEEE 802.19 Working Group is currently defining coexistence rules for heterogeneous secondary networks. Embodiments of the present invention enable coexistence between heterogeneous secondary networks and coexistence between secondary networks and primary networks that are required to be protected. Primary networks and users are incumbent users of the selected frequency band that have a form of priority access to the band. Primary networks include networks operating in FCC licensed bands, such as for commercial radio and television broadcasting. Secondary networks and users are allowed to use the selected band only if there are resources that are not used by the primary users. Secondary networks include any broadband networks operating unlicensed in the TV white spaces (TVWS) and using transmission devices that comply with the FCC requirements for TV Band Devices (TVBDs). Fixed TVBD devices must include geo-location and query a database to determine allowed channels. Portable TVBD devices must be able to access geo-location data and include a spectrum sensing capability to identify TV and wireless microphone signals.

The FCC has adopted rules to allow unlicensed radio transmitters to operate in the broadcast television spectrum at locations where that spectrum is not being used by licensed broadcasters. The FCC required the use of geolocation to establish the location of the unlicensed transmitter and a database of TV bands use by licensed broadcasters organized by their geographic coverage areas, to enable the unlicensed transmitter to know where local TV white space bands may be available. The FCC required the use of spectrum sensors in the unlicensed transmitter to detect the presence of the incumbent, primary TV broadcaster's signal in the local TV white space band to enable the unlicensed transmitter to immediately relinquish using the band. A primary user in such a local TV white space band would be an incumbent TV broadcaster licensed to operate in that band, but in those geographic areas where there are no licensed incumbent TV broadcasters in operation, other unlicensed secondary users may make use of that band.

Other RF spectrum white spaces may be locally unused in certain geographic areas, such as the frequency allocations from maritime radio in landlocked areas remote from the sea. A primary user in such a maritime radio band would be a maritime radio licensed to operate in that band, but in those geographic areas where there are no licensed maritime radios in operation, other unlicensed secondary users may make use of that band. Similarly, locally unused RF spectrum white spaces may be present in certain geographic locations, such as the frequency allocations from 2.025 GHz to 2.110 GHz for earth stations to transmit to communications satellites, in areas remote from such earth stations. A primary user in such a satellite earth station radio band would be a satellite earth station licensed to operate in that band, but in those geographic areas where there are no satellite earth stations in operation, other unlicensed secondary users may make use of that band.

Embodiments of the present invention apply coexistence rules to enable heterogeneous secondary networks to share available resources in a fair manner and not cause harmful interference to primary networks. Embodiments of the present invention enable the dynamic allocation in TV white spaces (TVWS), of different networks with different standards in different available channel situations. Embodiments of the present invention determine whether the allocation analysis needs to be applied to all real neighbors.

Example embodiments are disclosed for independent wireless resource sharing on a fair basis to enable selecting the most suitable coexistence between wireless networks.

Example embodiments of the invention include a hierarchical resource request process that enables reallocation of radio resources in a coexistence band. When new resources are requested by a network, a search is made for free resources in the coexistence band. If this does not succeed, a check is made for any allocated but unused resources in the coexistence band that have been advertised by neighboring networks in the same network allocation group. If there are insufficient advertised resources, then the allocation of resources in neighboring networks is analyzed and compared with the requesting network's need for network resources. There are two graduated stages to the analysis. In an example light analysis stage, an analysis of the allocation of resources is limited to neighboring networks within the same network allocation group as the requesting network's. In a more extensive analysis stage, all of the neighboring networks are analyzed. In this manner, a more complete resource reallocation may be achieved.

Example embodiments of the invention include the steps to check if there is a free channel or if there are enough advertised resources. the order of these two steps may be reverser and optionally, either one of these two steps may be skipped.

Example embodiments of the invention include a resource reallocation that enables heterogeneous and unlicensed spectrum users to agree and negotiate on spectrum use to better coexist with each other.

Depending on the wireless environment state, including whether there have been any major changes in the local area of a wireless network after a previous resource allocation, the network needing more resources may initiate either a light resource request process directed only to the networks in the same network allocation group or a more extensive resource request process directed to all networks within interference range. This selective possibility brings more stability to environment when resource needs are varying.

According to at least one embodiment of the present invention, independent wireless resource sharing is achieved on a fair basis to enable selecting the most suitable coexistence between wireless networks.

Radio resource allocations may be changed when a network sees a clear need for a reallocation from its perspective. Each network has a view of its own and its real neighbors' allocations and environmental state based on spectrum mapping, for example. This information may be one of several factors in performing the radio resource allocation analysis.

FIG. 1 is an example system architecture diagram according to an embodiment of the present invention, illustrating the coverage of an IEEE 802.16h wireless metropolitan area network (WMAN) cell overlapped by an IEEE 802.11 wireless local area network (WLAN) cell. An IEEE 802.16h WMAN STA 6 exchanges wireless broadband messages with an IEEE 802.16h WMAN base station 8 in a WMAN network "D". The WLAN access point STA1 exchanges wireless broadband messages with an IEEE 802.11 client device STA2, such as a personal computer over the WLAN network "B". Both IEEE 802.11 WLAN access point STA1 and the IEEE 802.11 client device STA2 interfere with the IEEE 802.16h WMAN STA 6. For example, WLAN devices are typically designed for better resistance to saturation than WMAN devices, since WMAN devices must be more sensitive to attenuated signals received over a greater range than are WLAN devices and are therefore more sensitive to interference. Both the WLAN access point STA1 and IEEE 802.11 client device STA2 are TV white space (TVWS) devices, meaning that they are equipped to communicate over the dedicated TV white space band 30. Similarly, the IEEE 802.16h WMAN STA 6 and the IEEE 802.16h WMAN base station 8 are TV white space (TVWS) devices, meaning that they are equipped to communicate over the dedicated TV white space band 30. Thus, the interference of the IEEE 802.16h WMAN STA 6 by both the IEEE 802.11 WLAN access point STA1 and the IEEE 802.11 client device STA2 may be ameliorated by reallocating the IEEE 802.11 frames from the WLAN network "B" to the TV white space band link 3. The dedicated TV white space band 30 may be shared by many terminals using diverse communication protocols. For example, if the WMAN network "D" reaches its maximum capacity, the traffic congestion may be alleviated by reallocating the IEEE 802.16h frames from the WMAN network "D" to the TV white space band link 4. A third device, STA3, is present in the 802.11 WLAN cell of STA1, as part of a neighboring network "A" with 802.11 AP STA5. STA3 is also a TV white space (TVWS) device and has reallocated frames on TVWS link 9 communicating over the dedicated TV white space band 30. A fourth device, STA4, is present in the 802.11 WLAN cell of STA1, as part of a neighboring network "F" with 802.11 AP STAT. STA4 is also a TV white space (TVWS) device and has reallocated frames on TVWS link 15 communicating over the dedicated TV white space band 30.

Other network topologies may make use of example embodiments of the invention, for example more heterogeneous networks, each of which has an Internet connection that they may use first for neighboring network discovery.

FIG. 1 also shows three example white space bands locally unused by licensed primary users of their respective RF spectrum white spaces, which may be used by the WLAN access point STA1 or client device STA2, operating as unlicensed secondary users. TV white space band 31 is locally unused by licensed TV broadcasters. Maritime radio band 33 is locally unused by licensed maritime band radios. Earth station-to-satellite radio band 35 is locally unused by licensed earth station radios. An example of a TV white space band 31 locally unused by licensed TV broadcasters is the 174-204 MHz band, representing the local absence of broadcast VHF TV channels 7, 8, 9, 10, and 11. If there were a local absence of licensed broadcasters in TV white space band 31, on VHF TV channels 7, 8, 9, 10, and 11, which would otherwise interfere with the WLAN access point STA1 or client device STA2, then they could operate as unlicensed secondary users and make use of TV white space band 31. If either STA1 or STA2 were to detect a signal transmitted from a neighboring TV broadcaster in band 31, then they would have to relinquish their use of the TV white space band 31 and make a resource request, in accordance with the example embodiments of the invention.

A maritime radio operates in a number of licensed frequency allocations and is a primary user in the maritime radio band 33. If there were no licensed maritime radios in operation that would interfere with the WLAN access point STA1 or client device STA2, then they could operate as unlicensed secondary users and make use of maritime radio band 33. If either STA1 or STA2 were to detect a signal transmitted from a neighboring maritime radio, then they would have to relinquish their use of the maritime band 33 and make a resource request, in accordance with the example embodiments of the invention.

A satellite earth station transmits to satellites in licensed frequency allocations from 2.025 GHz to 2.110 GHz and is a primary user in the earth-to-satellite band 35. If there were no licensed earth station radios in operation that would interfere with the WLAN access point STA1 or client device STA2, then they could operate as unlicensed secondary users and make use of earth-to-satellite radio band 35. If either STA1 or STA2 were to detect a signal transmitted from a neighboring earth station radio, then they would have to relinquish their use of the earth-to-satellite band 35 and make a resource request, in accordance with the example embodiments of the invention.

FIG. 1A is an example system architecture according to an embodiment of the present invention, illustrating an example relationship between the coexistence manager, the primary database, and the coexistence network element CoexServ. A network of distributed coexistence managers 102 and 103 may communicate with one another over the Internet, in an example embodiment of the invention. The coexistence enabler 100 in the IEEE 802.11 WLAN access point STA1 for a Network "B" is collocated with the TVWS coexistence manager 102. The coexistence enabler 100' in the IEEE 802.16h WMAN base STA8 for a Network "D" is collocated with the TVWS coexistence manager 103. The distributed coexistence managers 102 and 103 may communicate over the Internet with the TVWS primary database 104 and the TVWS coexistence network element CoexServ 106, in an example embodiment of the invention.

If there has been a major change in the network neighborhood after a previous resource allocation, resulting in there being not enough free or advertized resources are available to satisfy the requirements of Network "B", the coexistence enabler 100 and coexistence manager 102 may initiate a resource reallocation process. The resource reallocation process may be either a light resource request process directed only to the networks in the same network allocation group or a more extensive resource request process directed to all networks within interference range. This graduated analysis brings more stability to the network environment when resource needs are varying. Example steps in requesting a reallocation of resources are:

coexistence enabler 100 identifies excess resource need because of:
  Internal request
  Coexistence communication trigger
coexistence enabler 100 sends a Resource Request to its coexistence manager 102.
coexistence manager 102 analyses environment situation using
  Spectrum map (a separate process to keep updated)
coexistence manager 102 determines resource allocation process
  More extensive: change in number of available channels for secondary users or in number of secondary networks
  Light: other cases
coexistence manager 102 initiates resource allocation if coexistence enabler 100 is eligible or other suitable free resources available.

Examples of a network allocation group include self-coexistence scenarios where two systems (a base station or access point and the associated mobile station or STA) use the same technology and may share a frequency channel. For example, an IEEE 802.11 WLAN may coexist with another IEEE 802.11 WLAN in sharing a TV white space band, if both systems use the same physical layer (PHY) technology and channel width. In another example, an IEEE 802.16h WMAN coexists with another IEEE 802.16h WMAN in sharing a TV white space band.

Other examples of a network allocation group include different IEEE 802 network technologies that may be time division multiplexed based on the IEEE 802.16h draft standard and are synchronized with a GPS clock or IEEE 1588 or IETF network time protocol clocks.

Example embodiments of the architecture of FIG. 1A show the relationship between the coexistence enabler 100 and the coexistence manager 102 in the TV white space (TVWS) WLAN access point STA1 and the distributed coexistence manager 103 in the TVWS base STAB. The coexistence enabler 100 has to obtain information required for coexistence from a traffic network or device representing it. This includes configuration and control of measurements. Also, the coexistence enabler 100 has to provide reconfiguration commands and control information to the Network "B" or the WLAN access point STA1, corresponding to coexisting decisions received from coexistence managers 102 and 103, respectively. The coexistence manager 102 is responsible for discovery of Coexistence Managers (CM)s 103 managing neighboring wireless networks, for example, and coexistence related information may be exchanged with them. The coexistence manager 102 o 103 has the needed information to make decisions of resource sharing among the Coexistence Managers (CM)s managing neighboring wireless networks.

The example system architecture of FIG. 1A shows the coexistence enabler 100 and coexistence manager 102 in the TV white space WLAN access point STA1 for a Network "B". In the example shown, the TV white space (TVWS) WLAN access point STA1 includes a coexistence enabler 100 and coexistence manager 102, and is serving as an access point for the TVWS wireless device STA2 in the Network "B", which may be, for example, an IEEE 802.11 WLAN. The IEEE 802.16h WMAN base STA 8 is also a TV white space (TVWS) wireless device and includes a coexistence enabler 100' and coexistence manager 103, and communicates with the WMAN STA 6. IEEE 802.16h WMAN base station 8 is in the WMAN network "D", which may be, for example, an IEEE 802.16h WMAN. The coexistence manager 102 handles resource requests from the coexistence enabler 100 in STA1. The coexistence manager 103 handles resource requests from the coexistence enabler 100' in base STA 8. The TV white space (TVWS) WLAN access point STA1 in the Network "B" includes a Network "B" MAC and PHY to communicate over the Network "B". The IEEE 802.16h WMAN base STA 8 in the Network "D", includes a Network "D" MAC and PHY to communicate over the Network "D". Each TV white space (TVWS) wireless devices STA1 in the Network "B" and STA 6 in the Network "D", includes a TV white spaces MAC and PHY to communicate in channels in the TV white spaces band reallocated by the coexistence manager 102 and 103, respectively, without mutual interference. The coexistence enablers 100 and 100' in STA1 and in base STA 8 send resource requests to the respective coexistence managers 102 and 103.

The example system architecture of FIG. 1A shows the coexistence manager 102 receiving a resource request from the coexistence enabler 100 in TV white space (TVWS) WLAN access point STA1. The coexistence manager 102 has received Spectrum sensing results and network parameters from the coexistence enabler 100 in device STA1. Network parameters may include specific user requirements (user load, QoS, priority, etc), aggregate spectral efficiency, etiquette (first come, first served, etc.), and user or network policies. The coexistence manager 102 accesses the primary database 104 to obtain available secondary channels in the TV white space band. The coexistence manager 102 accesses the coexistence network element CoexServ 106 to obtain Potential neighbor networks' addresses. The coexistence manager 102 processes this data in conjunction with Spectrum maps, Operational parameters, and Time base sync, to determine a resource reallocation for the coexistence enabler 100 in device STA1. The coexistence manager 102 then sends to the coexistence enabler 100 in device STA1 the resource reallocation, including Operational parameters, Quiet period parameters, Spectrum sensing strategy, and Time base sync. The coexistence enabler 100 in device STA1 then controls the medium access control (MAC) to communicate in channels in the TV white spaces band reallocated by the coexistence manager 102, without interference from other networks sharing the same white space channels. A similar operation may be carried our by the coexistence manager 103 in conjunction with the coexistence enabler 100' in base STA 8. A network of distributed coexistence managers 102 and 103 may communicate with one another over the Internet 105.

Figure 1B:
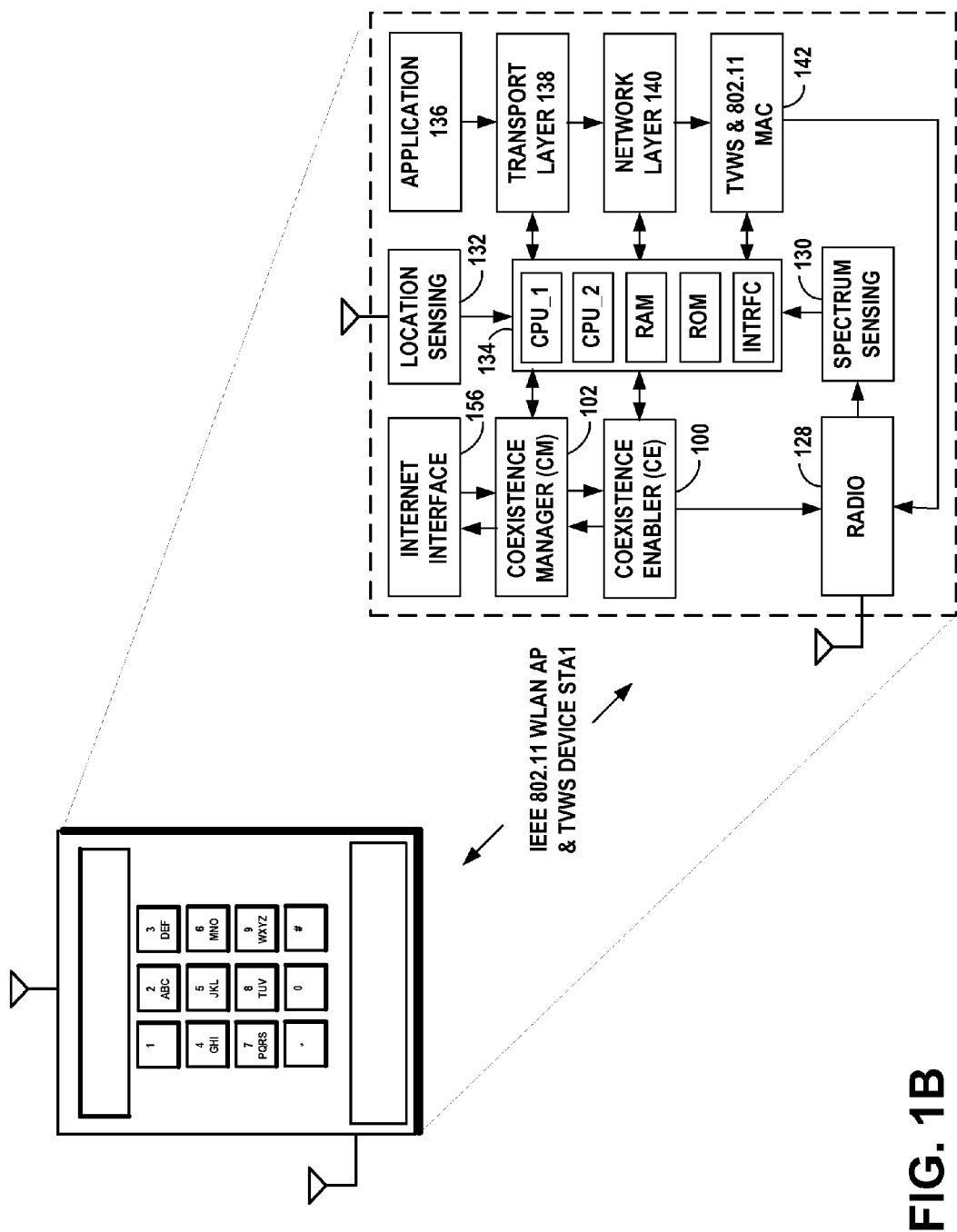
FIG. 1B is an example functional block diagram according to an embodiment of the present invention, illustrating an example TV white space wireless device including the coexistence manager and the coexistence enabler for a network. The device may be configured to operate in additional RF spectrum white space bands wherein there are no primary user radios operating in the neighboring wireless networks.

FIG. 1B is an example functional block diagram according to an embodiment of the present invention, illustrating an example TV white space WLAN access point STA1 including the coexistence enabler 100 for Network "B" and coexistence manager 102. The example device STA1 includes a protocol stack for Network "B", including the radio 128 and the Network "B" IEEE 802.11 MAC 142, which may be based, for example, on the IEEE 802.11 WLAN standard. The MAC 142 includes integrated TV white space features. The protocol stack may also include a network layer 140, a transport layer 138, and an application program 136. The example device STA1 includes a processor 134 that includes a dual core central processing unit CPU_1 and CPU_2, a RAM memory, a ROM memory, and an interface for a keypad, display, and other input/output devices. A location sensor 134, such as a GPS is included to establish the geographic location of the device STA1, and the location of the STA1 is reported to the coexistence manager 102. The coexistence enabler 100 sends resource requests to the coexistence manager 102. The MAC 142 includes integrated TV white space features to communicate using the radio 128 in channels in the TV white spaces band reallocated by the coexistence manager 102, without mutual interference. The spectrum sensor 130 senses the electromagnetic environment of the STA1 and reports it to the coexistence manager 102.

The interface circuits in FIG. 1B may interface with one or more radio transceivers, battery and other power sources, key pad, touch screen, display, microphone, speakers, ear pieces, camera or other imaging devices, etc. The RAM and ROM may be removable memory devices such as smart cards, SIMs, WIMs, semiconductor memories such as RAM, ROM, PROMS, flash memory devices, etc. The processor protocol stack layers, and/or application program may be embodied as program logic stored in the RAM and/or ROM in the form of sequences of programmed instructions which, when executed in the CPU, carry out the functions of the disclosed embodiments. The program logic may be delivered to the writeable RAM, PROMS, flash memory devices, etc. of the coexistence enabler and coexistence manager from a computer program product or article of manufacture in the form of computer-usable media such as resident memory devices, smart cards or other removable memory devices, or in the form of program logic transmitted over any transmitting medium which transmits such a program. Alternately, they may be embodied as integrated circuit logic in the form of programmed logic arrays or custom designed application specific integrated circuits (ASIC). The one or more radios in the device may be separate transceiver circuits or alternately, the one or more radios may be a single RF module capable of handling one or multiple channels in a high speed, time and frequency multiplexed manner in response to the processor.

Figure 1C:
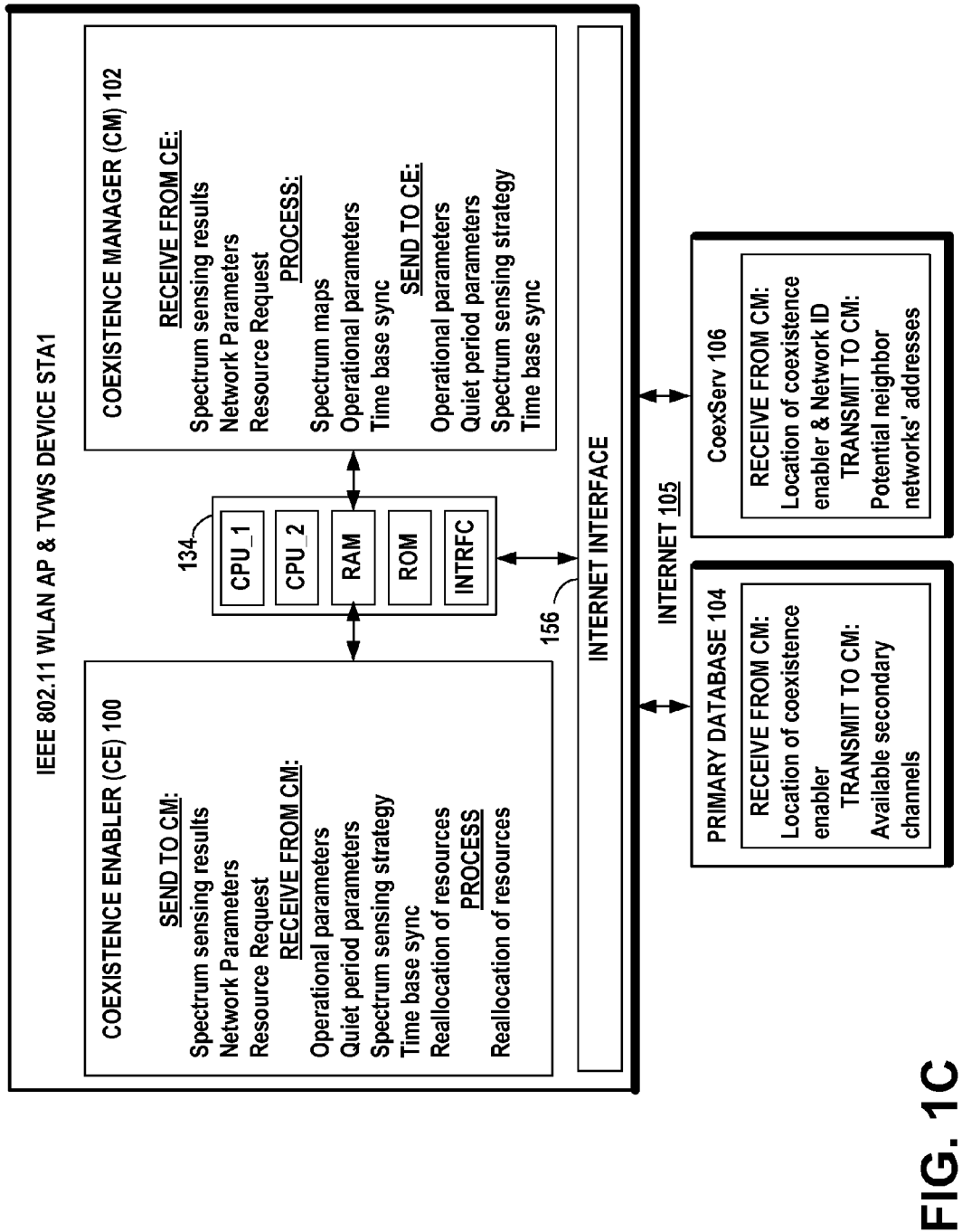
FIG. 1C is an example functional block diagram according to an embodiment of the present invention, illustrating the IEEE 802.11 WLAN AP and TVWS device STA1, which includes the coexistence manager and the coexistence enabler, communicating over the Internet with the primary database and the coexistence network element CoexServ.

FIG. 1C is an example functional block diagram according to an embodiment of the present invention, illustrating the IEEE 802.11 WLAN AP & TVWS device STA1 that includes both the coexistence manager 102 and the coexistence enabler 100. The coexistence manager 102 communicates with the primary database 104 and the coexistence network element CoexServ 106 via the Internet interface 156. The coexistence manager 102 accesses the primary database 104 to obtain available secondary channels in the TV white space band. The coexistence manager 102 accesses the coexistence network element CoexServ 106 to obtain Potential neighbor networks' addresses. The coexistence manager 102 sends resource reallocation messages to the coexistence enabler 100. The example coexistence manager 102 includes a processor 154 that includes a dual core central processing unit CPU_1 and CPU_2, a RAM memory, a ROM memory, and an interface for input/output devices. The database interface 156 provides the interface to the primary database 104 and the coexistence network element CoexServ 106.

The interface circuits in FIG. 1C may interface with one or more radio transceivers, battery and other power sources, key pad, touch screen, display, microphone, speakers, ear pieces, camera or other imaging devices, etc. The RAM and ROM may be removable memory devices such as smart cards, SIMs, WIMs, semiconductor memories such as RAM, ROM, PROMS, flash memory devices, etc. The processor protocol stack layers, and/or application program may be embodied as program logic stored in the RAM and/or ROM in the form of sequences of programmed instructions which, when executed in the CPU, carry out the functions of the disclosed embodiments. The program logic may be delivered to the writeable RAM, PROMS, flash memory devices, etc. of the coexistence enabler from a computer program product or article of manufacture in the form of computer-usable media such as resident memory devices, smart cards or other removable memory devices, or in the form of program logic transmitted over any transmitting medium which transmits such a program. Alternately, they may be embodied as integrated circuit logic in the form of programmed logic arrays or custom designed application specific integrated circuits (ASIC). The one or more radios in the device may be separate transceiver circuits or alternatively, the one or more radios may be a single RF module capable of handling one or multiple channels in a high speed, time and frequency multiplexed manner in response to the processor.

Figure 1D:
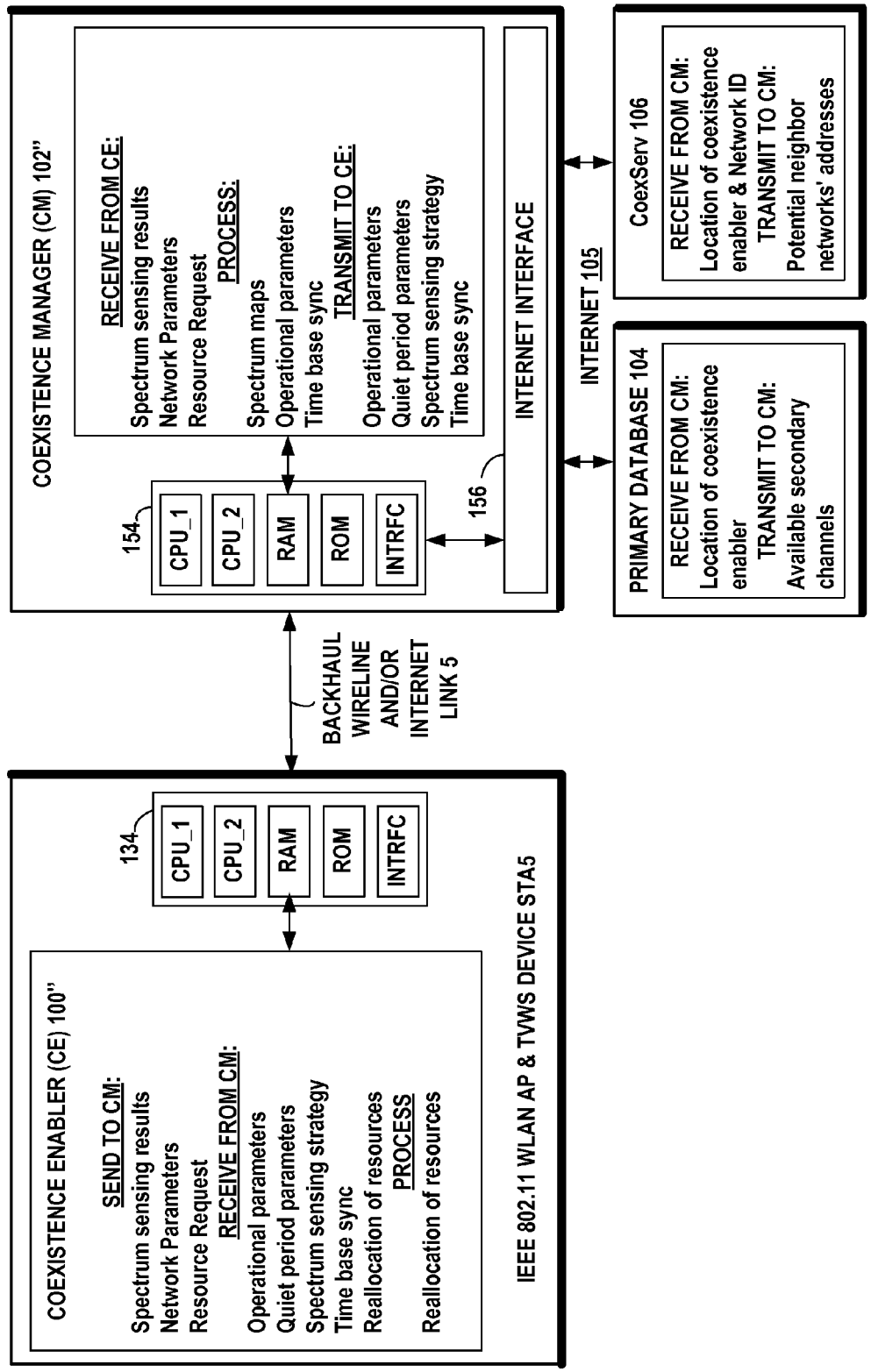
FIG. 1D is an example network diagram according to another embodiment of the present invention, illustrating the IEEE 802.11 WLAN AP and TVWS device STA5, which includes the coexistence enabler, communicating over a backhaul wireline and/or internet link with the coexistence manager.

FIG. 1D is an example network diagram according to another embodiment of the present invention, illustrating the IEEE 802.11 WLAN AP and TVWS device STA5, which includes the coexistence enabler 100", communicating over a backhaul wireline and/or internet link 5 with the coexistence manager 102".

Figure 1E:
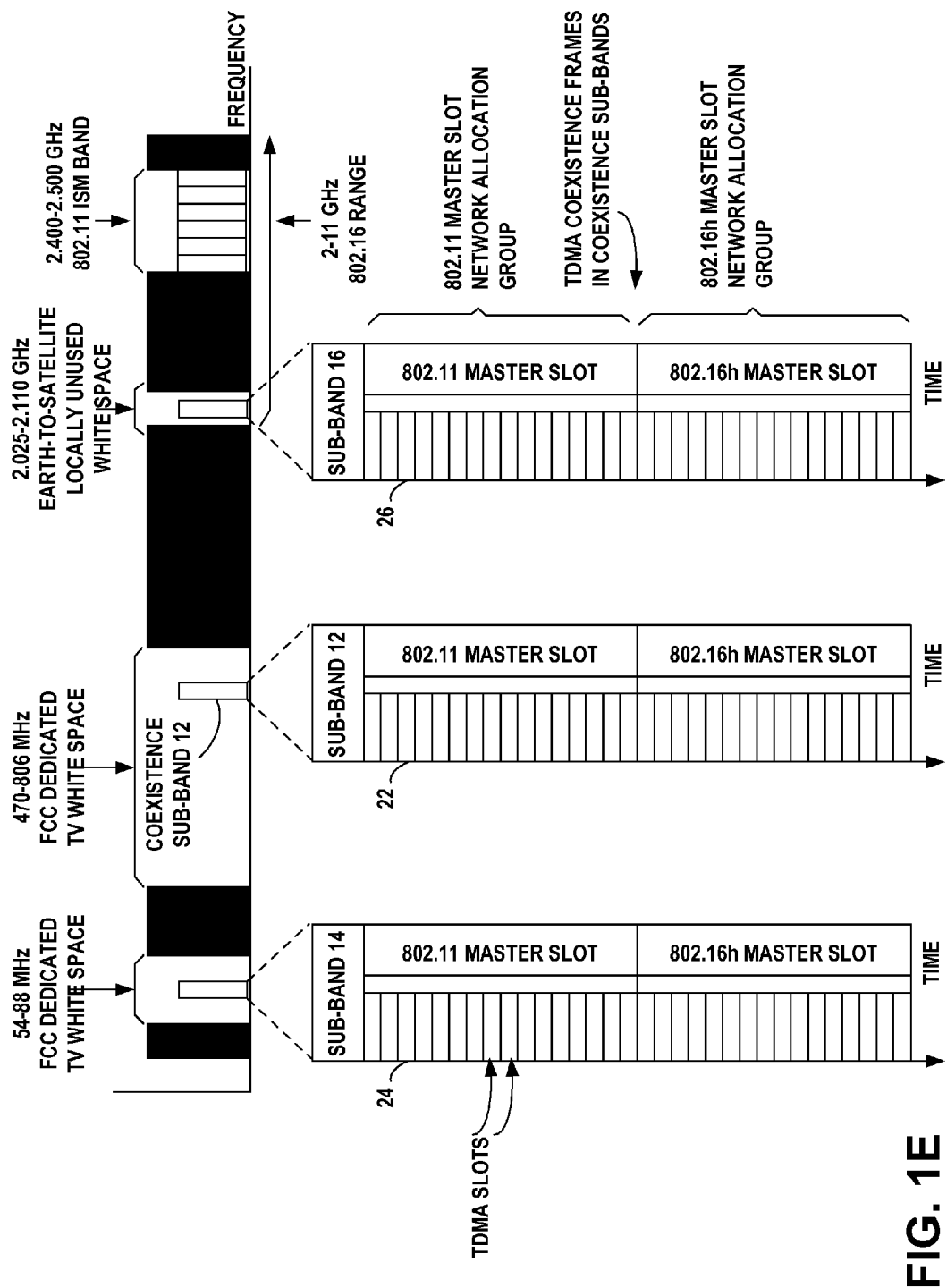
FIG. 1E is an example frequency band diagram illustrating an example TDMA coexistence frame 22 in sub-band 12 in the FCC dedicated TV white space band of 470-806 MHz, an example TDMA coexistence frame 24 in sub-band 14 in the FCC dedicated TV white space band of 54-88 MHz, and an example TDMA coexistence frame 26 in sub-band 16 in the earth station-to-satellite locally unused white space band 2.025 GHz to 2.110 GHz, according to an embodiment of the present invention.

FIG. 1E is an example frequency band diagram illustrating an example TDMA coexistence frame 22 in sub-band 12 in the FCC dedicated TV white space band of 470-806 MHz, an example TDMA coexistence frame 24 in sub-band 14 in the FCC dedicated TV white space band of 54-88 MHz, and an example TDMA coexistence frame 26 in sub-band 16 in the earth station-to-satellite locally unused white space band 2.025 GHz to 2.110 GHz, according to an embodiment of the present invention. License-exempt access to these bands as a secondary use for coexistence of networks requesting additional resources, may include restrictions on geographic location, transmission power, range, and bandwidth of the transmissions of the requesting networks.

For example, the 802.11 WLAN standards specify an OFDM-based physical layer with a bandwidth of 20 MHz channel separation. At 11 MHz from the center of the channel, the energy is approximately 20 dB lower than the maximum signal level. Further away from the centre frequency, the energy levels fall further resulting in minimal interference on adjacent channels. The TV white space bands at 54-88 MHz and at 470-806 MHz are good candidates for coexistence of an 802.11 WLAN wireless LAN channel. The earth station-to-satellite white space band at 2.025 GHz to 2.110 GHz is a good candidate for coexistence of an 802.11 WLAN wireless LAN channel. A TV white space band locally unused by licensed TV broadcasters, for example, in the 174-204 MHz band, representing the local absence of broadcast TV channels 7, 8, 9, 10, and 11, as is the circumstance in the Richmond, Va. (USA) area, is a good candidate for coexistence of an 802.11 WLAN wireless LAN channel.

FIG. 1E shows an example of the location of the white spaces in the RF spectrum and example TDMA coexistence frames in the white space bands, showing the freely available time slots before any networks have been allocated slots. The white spaces include the FCC dedicated TV white space 54-88 MHz band, the FCC dedicated TV white space 470-806 MHz band, and locally unused the earth station-to-satellite white space band 2.025 GHz to 2.110 GHz.

There are a number of TVWS coexistence techniques possible for enabling two or more independently operated wireless networks or devices using different radio technologies adapted for TV white space frequency bands, to access the same TV white space frequency band in the same location without mutual interference. Some examples of coexistence techniques include dynamic frequency selection, transmit power control, listen-before-talk behavior, time division multiplexing different IEEE 802 technologies, message-based on-demand spectrum contention, and control through a centralized coexistence manager.

The example coexistence technique illustrated here for each sub-band 12, 14, and 16, is time division multiplexing of the slots in TDMA coexistence frames allocated to different IEEE 802 technologies. The two IEEE 802 technologies chosen for this example are the IEEE 802.16h WMAN standard and the IEEE 802.11 WLAN standard. The IEEE 802.16h WMAN uses a fixed outdoor base station, such as the WMAN base station 8, serving indoor and outdoor portable clients, such as the WMAN STA 6. The IEEE 802.11 WLAN station, such as the WLAN access point STA1, may include Internet access and geo-location capability. The TDMA coexistence frame may be divided into a IEEE 802.11 master slot network allocation group and an IEEE 802.16h master slot network allocation group. The IEEE 802.11 master slot network allocation group carries twelve free IEEE 802.11 WLAN white space slots. The IEEE 802.16h master slot network allocation group carries the twelve free IEEE 802.16h WMAN white space slots.

Figure 1F:
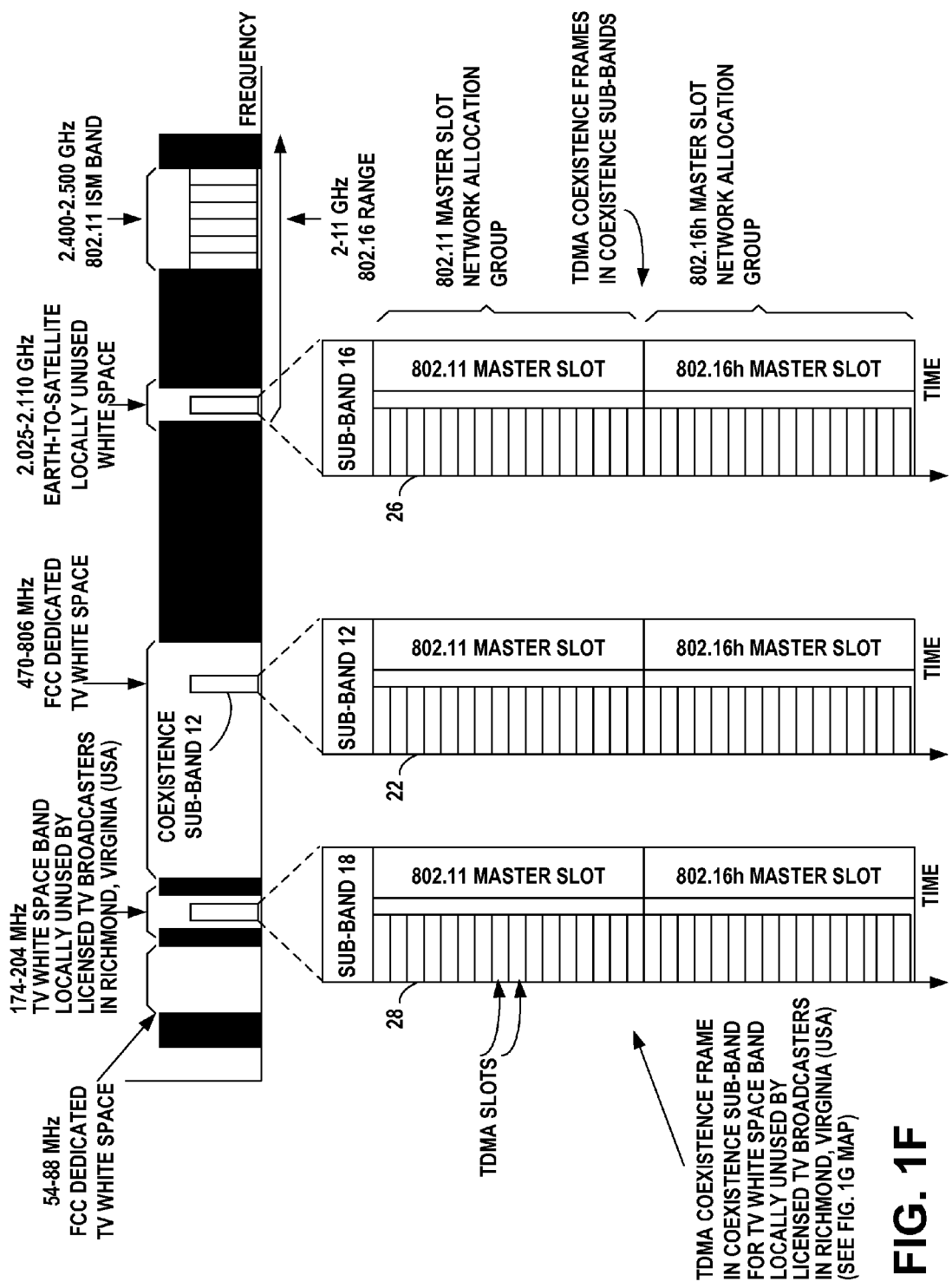
FIG. 1F is an example frequency band diagram illustrating an example TDMA coexistence frame 28 in sub-band 18 in the TV white space band locally unused by licensed TV broadcasters in the 174-204 MHz band, representing broadcast TV channels 7, 8, 9, 10, and 11 in the Richmond, Va. (USA) area, an example TDMA coexistence frame 22 in sub-band 12 in the FCC dedicated TV white space band of 470-806 MHz, and an example TDMA coexistence frame 26 in sub-band 16 in the earth station-to-satellite locally unused white space band 2.025 GHz to 2.110 GHz, according to an embodiment of the present invention.

FIG. 1F is an example frequency band diagram illustrating an example TDMA coexistence frame 28 in sub-band 18 in the TV white space band locally unused by licensed TV broadcasters in the 174-204 MHz band, representing broadcast TV channels 7, 8, 9, 10, and 11 in the Richmond, Va. (USA) area, an example TDMA coexistence frame 22 in sub-band 12 in the FCC dedicated TV white space band of 470-806 MHz, and an example TDMA coexistence frame 26 in sub-band 16 in the earth station-to-satellite locally unused white space band 2.025 GHz to 2.110 GHz, according to an embodiment of the present invention.

Figure 1G:
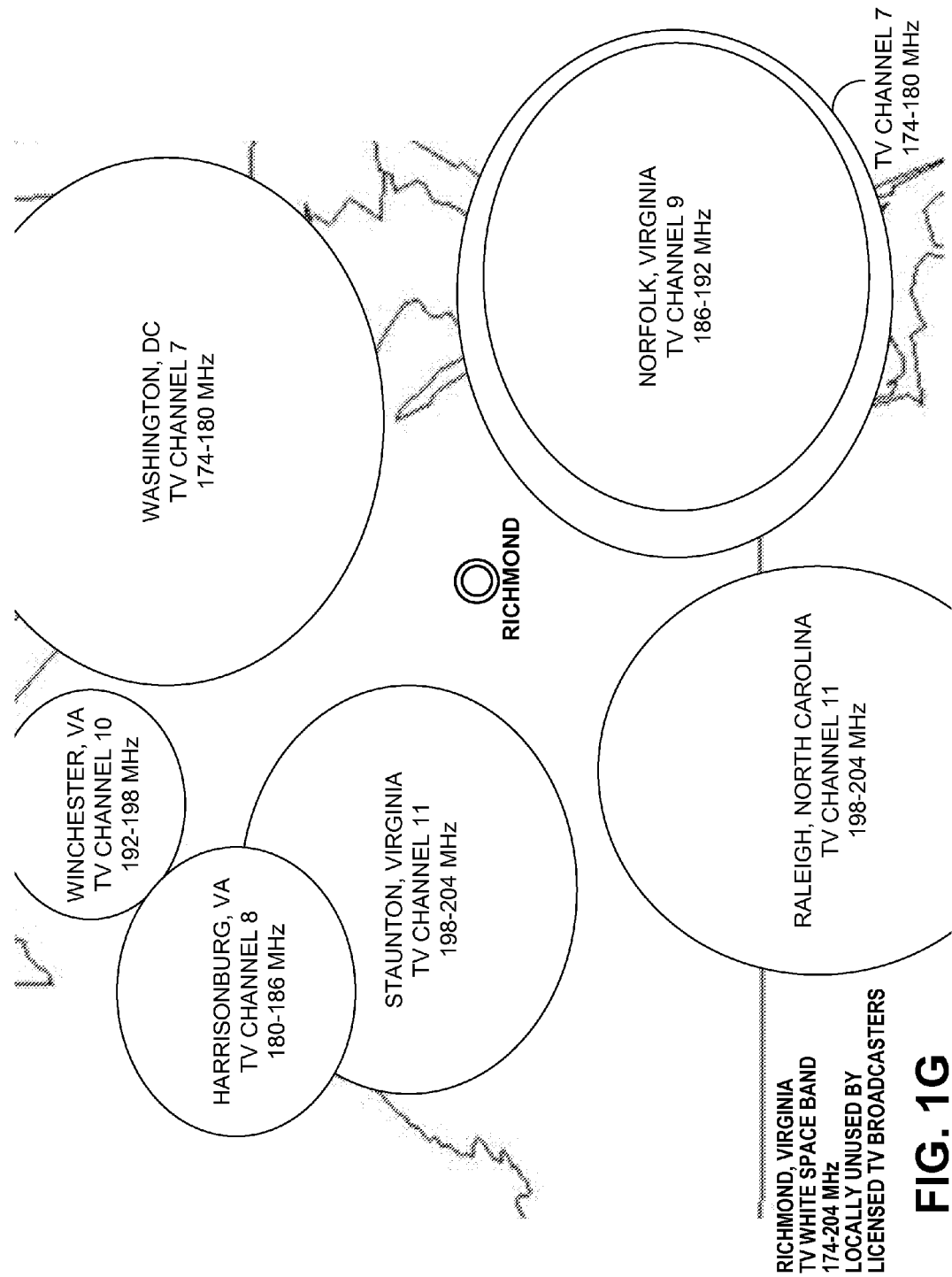
FIG. 1G is an example map of the Richmond, Va. (USA) geographic area and an overlay of coverage areas for broadcast TV channels 7, 8, 9, 10, and 11, illustrating that there is a locally available TV white space band that is unused by licensed TV broadcasters in the 174-204 MHz band.

FIG. 1G is an example map of the Richmond, Va. (USA) geographic area and an overlay of coverage areas for broadcast TV channels 7, 8, 9, 10, and 11, illustrating that there is a locally available TV white space band that is unused by licensed TV broadcasters in the 174-204 MHz band, as shown in FIG. 1F. The cities where there are TV broadcasters for TV channels 7, 8, 9, 10, and 11 in a circular area of approximately 160 kilometers in diameter surrounding the city of Richmond, Va., are shown in the following table. The map of FIG. 1G shows that there is no coverage by licensed TV broadcasters in the 174-204 MHz band, which is therefore a locally available TV white space band.

| WASHINGTON, DC | TV CHANNEL 7 | 174-180 MHz |
| NORFOLK, VIRGINIA | TV CHANNEL 7 | 174-180 MHz |
| HARRISONBURG, VA | TV CHANNEL 8 | 180-186 MHz |
| WASHINGTON, DC | TV CHANNEL 9 | 186-192 MHz |
| NORFOLK, VIRGINIA | TV CHANNEL 9 | 186-192 MHz |
| WINCHESTER, VA | TV CHANNEL 10 | 192-198 MHz |
| RALEIGH, NC | TV CHANNEL 11 | 198-204 MHz |
| STAUNTON, VIRGINIA | TV CHANNEL 11 | 198-204 MHz |

Figure 2:
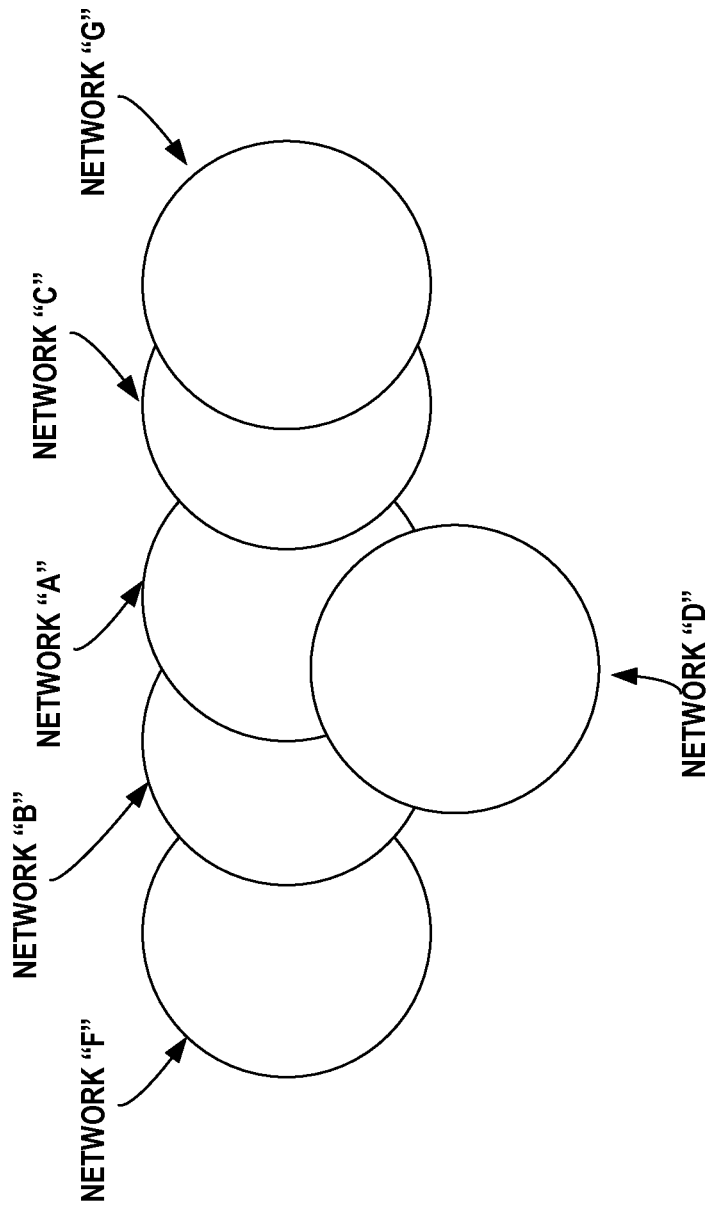
FIG. 2 is an example network topology scenario where the network "B" needs more resources, according to an embodiment of the present invention.

FIG. 2 is an example network topology scenario where the network "B" needs more resources, according to an embodiment of the present invention. Example embodiments of the invention specify the coexistence entities, their relationships and the resource request method, as illustrated by the following example. The FIG. 2 shows a network scenario, where the circles A, B, C, D, E, F, and G represent the coverage area of each network. These networks are controlled in coexistence by the coexistence enabler and the coexistence manager. Each network has its own coexistence enabler and may have its own coexistence manager or alternately one coexistence manager may control several networks, for example a company WLAN network with several APs.

Procedures to find real neighbors, how to analyze fair resource allocation between the real neighbors, and what content is to be communicated between real neighbors is described in the copending U.S. patent application Ser. No. 12/689,663. filed Jan. 19, 2010, entitled "Apparatus Identification In Coexistence Networking", by Mika Kasslin, Jari Junell, Juha Salokannel, assigned to Nokia Corporation and incorporated herein by reference.

The identification of neighboring networks may be performed by transmitting a request to a server, such as via an Internet connection, to inquire as to whether other networks are located near enough to the requesting network to be in an operational environment. The server may return information to the requesting network via the Internet identifying other proximately-located networks. The requesting network may utilize this information to communicate with the proximate networks.

In at least one example embodiment, the information provided by the server may include Internet addresses corresponding to network devices in potential neighboring wireless networks in the same operational environment as the requesting network. The requesting network may contact at least some of the potential neighboring networks via the Internet in order to request communication configuration and test information. The other potential networks may respond to these requests, and the requesting network may use the communication received configuration and test information to select a group of candidate neighboring networks. Candidate neighboring networks may be selected based on, for example, the distance from the requesting network to a potential neighboring network, transmission properties (for example, transmission power of potential neighboring networks), etc. Information needed for candidate selection may be provided by potential neighboring networks to the requesting network via an Internet connection.

In accordance with at least one example embodiment, the requesting network may then initiate testing the group of candidate neighboring networks. Testing may comprise transmitting one or more wireless signals that should be receivable by the candidate neighboring networks. The candidate neighboring networks that receive the wireless signals may then transmit reports to the requesting network via an Internet connection confirming receipt of a signal. The requesting network may utilize testing results to select real neighbor networks from the group of candidate neighboring networks.

Figure 3:
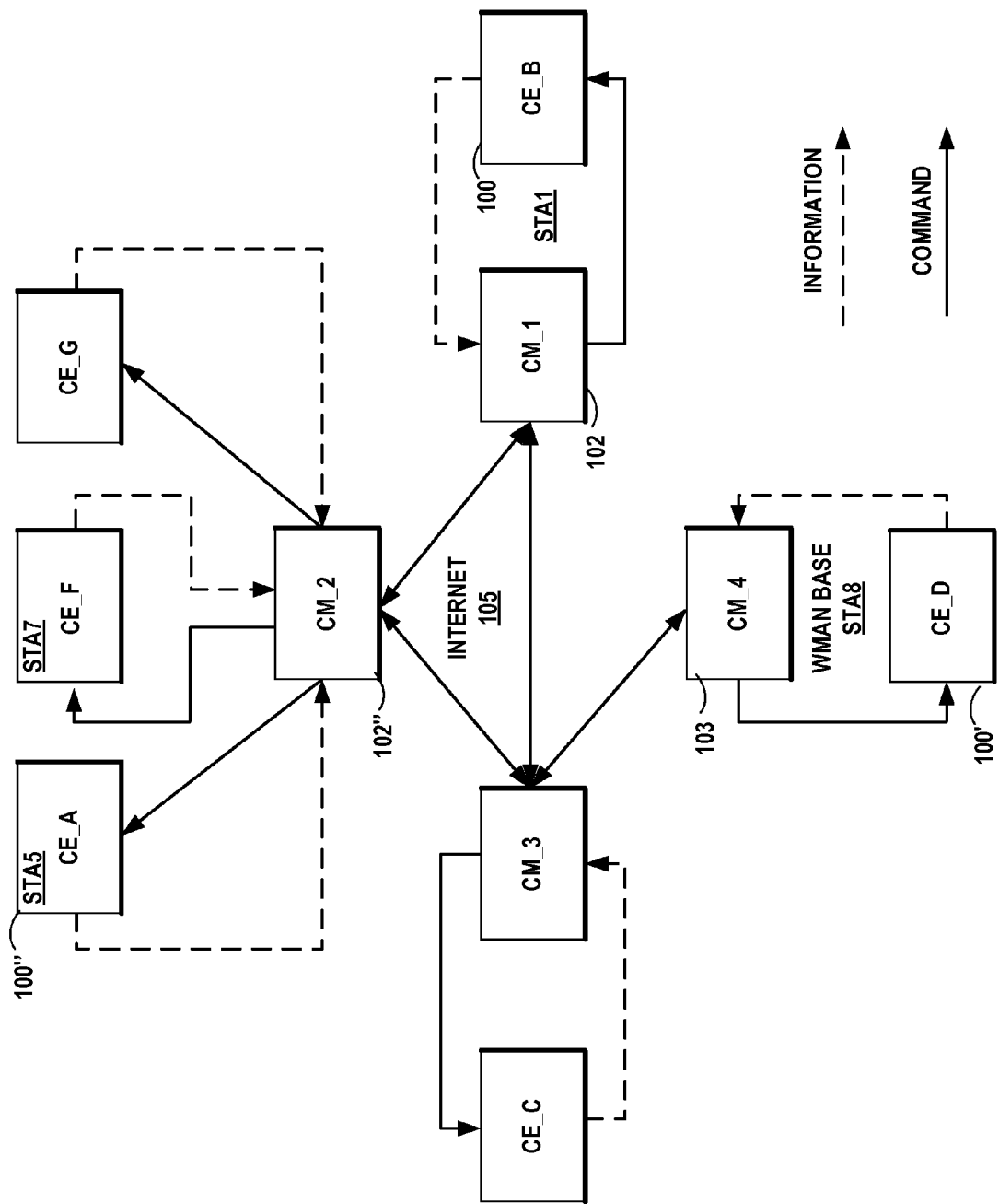
FIG. 3 is an example of coexistence management of the several networks shown in FIG. 2, according to an embodiment of the present invention.

FIG. 3 is an example of coexistence management of the several networks shown in FIG. 2, according to an embodiment of the present invention. Different coexistence managers 102 are connected together based on actual network overlapping below them. Also networks A, F, and G may form a company network, where each network has its own coexistence enabler 100", but all are managed by one coexistence manager 102". To complete the architecture view all coexistence managers has a connection to primary database 104 and coexistence network element CoexServ 106, as shown in FIG. 4A. It is possible that some networks may rely only on spectrum sensing (a special mode in FCC TV white spaces).

Figure 4:
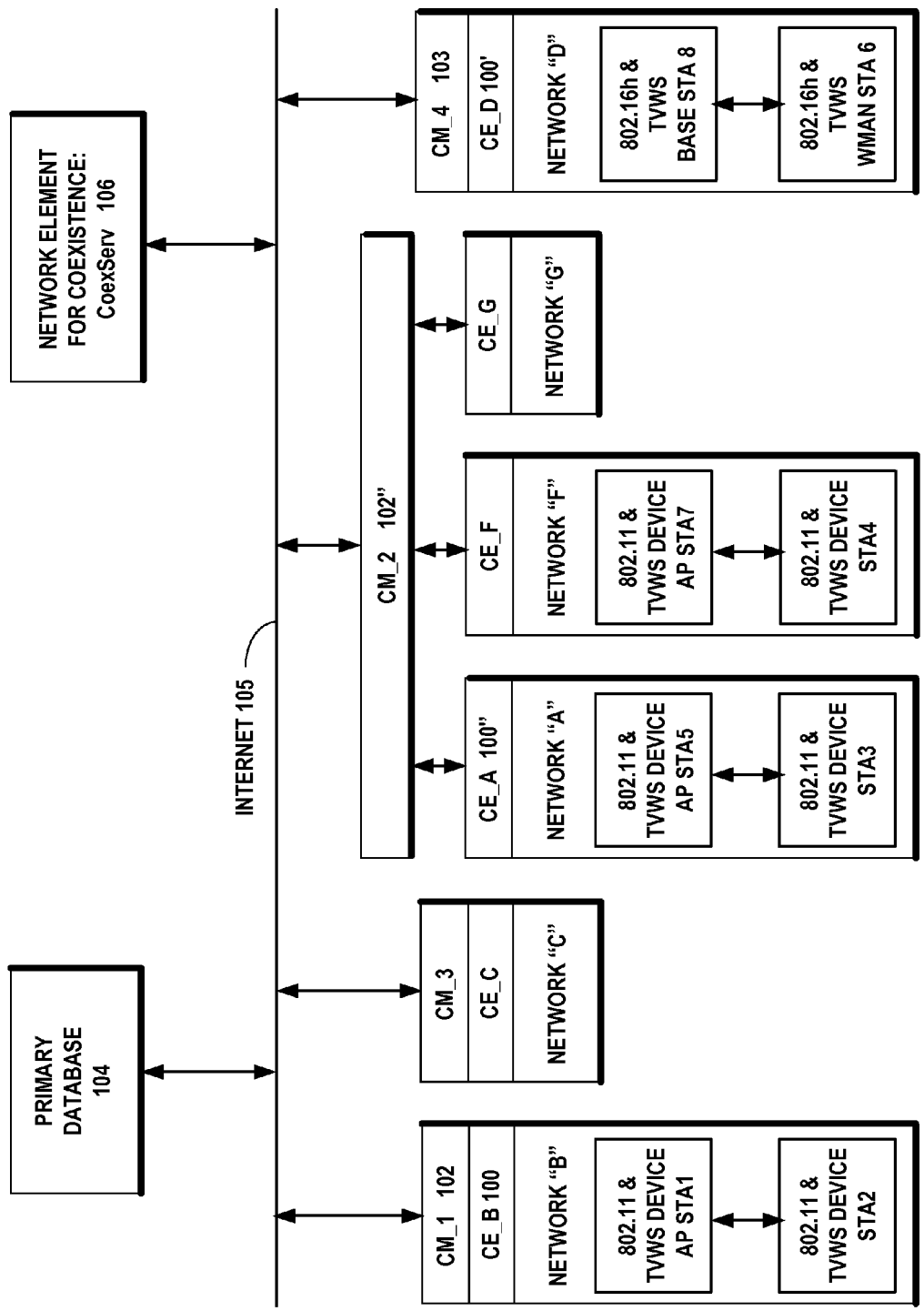
FIG. 4 is an example arrangement of the coexistence enablers for networks A through G, the coexistence managers serving the coexistence enablers, the primary database, and the coexistence network element CoexServ, according to an embodiment of the present invention.

FIG. 4 is an example arrangement of the coexistence enablers 100 for networks A through G, the coexistence managers 102 and 103 respectively serving the coexistence enablers 100 and 100', the primary database 104, and the coexistence network element CoexServ 106, according to an embodiment of the present invention. For example, the coexistence manager CM_1 serves a single coexistence enabler CE_B for network "B" that includes STA1. The coexistence manager CM_3 serves a single coexistence enabler CE_C for network "C". The coexistence manager CM_4 serves a single coexistence enabler CE_D 100' for the 802.16 network "D" that includes base STA 8. Coexistence manager CM_2 102" serves three coexistence enablers CE_A, CE_F, and CE_G. Coexistence enabler CE_A 100" serves network "A" that includes STA5 and STA3. Coexistence enabler CE_F serves network "F" that includes STA4. All four coexistence managers CM_1, CM_2, CM_3, and CM_4 may access each other over the Internet 105, based on actual network overlapping of the networks they serve. All of the coexistence managers CM_1, CM_2, CM_3, and CM_4 have a connection to the primary database 104 and coexistence network element CoexServ 106.

The coexistence manager 102 applies rules in making its determination of which of two networks based on different technologies, should be given priority in spectrum reallocation. For example, WLAN devices are typically designed for better resistance to saturation than WMAN devices, since WMAN devices must be more sensitive to attenuated signals received over a greater range than are WLAN devices. Thus, in example embodiments of the invention, the coexistence manager 102 will generally favor the reallocation of an 802.11 network to the TVWS band, instead of reallocating the 802.16 network, when spectrum reallocation is requested, so as to remove the source of disturbance from the vicinity of 802.16 network.

The coexistence manager (CM) 102 decides, if no free channel or enough advertised resources were available whether to grant the request by determining whether resource allocation requires an extensive reallocation or a light reallocation of a number of secondary channels or networks. In a light resource request process, for example, a change in the number of terminals within a single frequency channel may require changes only among the allocations between the users of that channel. In an extensive resource request process, for example, if a primary user reserves a channel, then all secondary users of that channel need to be reallocated to other channels, and a more complete resource reallocation may be initiated.

The coexistence manager 102 then sends to the coexistence enabler 100 in device STA1 the resource reallocation, including Operational parameters, Quiet period parameters, Spectrum sensing strategy, and Time base sync. The coexistence enabler 100 in device STA1 then controls the TV white space MAC to communicate in channels in the TV white spaces band reallocated by the coexistence manager 102, without interference from other networks sharing the same white space channels.

An example embodiment of the types of information exchanged between the coexistence manager 102, primary database 104, CoexServ 106, and coexistence enabler 100 may be as follows.

Between coexistence manager and Primary database:
→Location of coexistence enabler to Primary database
←Available channels for secondary usage to coexistence manager Between coexistence manager and CoexServ:
→Location of coexistence enabler to CoexServ
→Network ID to CoexServ
←Potential neighbor networks' addresses to coexistence manager Processing in coexistence manager:
↔ Spectrum maps
↔ Operational parameters of its own (alternative 1), operational parameters of its own and real neighbors (alternative 2)
↔ time base sync Between coexistence manager and coexistence enabler:
→Operational parameters to coexistence enabler
→Quiet period parameters to coexistence enabler
→Spectrum sensing strategy to coexistence enabler
→Time base sync to coexistence enabler
←Spectrum sensing results to coexistence manager
←Network parameters to coexistence manager
←Resource Request to coexistence manager Procedures to find real neighbors, how to analyze fair resource allocation between the real neighbors, and what content is to be communicated between real neighbors is described in the copending U.S. patent application Ser. No. 12/689,663. filed Jan. 19, 2010, entitled "Apparatus Identification In Coexistence Networking", by Mika Kasslin, Jari Junell, Juha Salokannel, assigned to Nokia Corporation and incorporated herein by reference.

In example embodiments of the invention, the objective in the resource request process is to keep the changes in spectrum allocations within as small a number of networks as possible, but still maintain fairness between the secondary networks. The operating principle to accomplish this is to first search for a free channel and/or advertised free resources, these two first steps may be implemented in opposite order or one of them may be skipped. And then divide spectrum reallocation into light and more extensive resource requests, corresponding to the stimulus that invokes the resource request process. This results in more stability, on an average, to changes in allocations and avoids a request causing an avalanche of new allocation requests to neighboring networks.

When a need for new resources is requested by the coexistence enabler, the coexistence manager of a secondary network will first check if there was a free channel or enough free advertised resources in neighborhood. If there are not enough resources seen, the coexistence manager will analyze the local network environment and then select a suitable resource request process. The basic reasons for a resource request include:

1. A primary has appeared in a channel currently available for secondary usage; a) occupied at the moment by a secondary network or b) free or backup/evacuation channel.
2. A new secondary network has entered the area
3. Interference level by some cause has raised to intolerable level
4. A new channel is found available for secondary usage
5. A secondary network in the area has closed its operation
6. A secondary network has need for more resources
7. A secondary network is releasing resources The first three reasons for a resource request will initiate a more extensive resource request, since there is either a change in the number of available networks or the number of secondary networks is reduced. The appearance of a primary network may be found by spectrum sensing with the coexistence enabler and the coexistence enabler will then report that appearance to the coexistence manager. The appearance of a primary network may also be found when the primary database 104 communicates that information to the coexistence manager, causing the coexistence manager to command the coexistence enabler to shift the network.

The appearance of a new secondary network may be also found by spectrum sensing with the coexistence enabler and the coexistence enabler will then report that appearance to the coexistence manager. The appearance of a new secondary network may be also found directly from the network to the coexistence manager, with the help of the CoexServ 106 to sort out whether these two networks are real neighbors.

The fourth and fifth reasons for a resource request, either a new channel is found available for secondary usage or a secondary network in the area has closed its operation, may be a cause for some networks to initiate more extensive resource allocation.

The sixth and seventh reasons for a resource request, either a secondary network has need for more resources or a secondary network is releasing resources, may result in a light resource allocation.

After a more extensive resource request has been made, each network has been allocated to a certain network allocation group and to each of these groups is allocated a certain quantity of channels based on the number of networks in each group and network parameters characterizing the group. In a light resource request, the resources are only reallocated among those networks that belong to the same network allocation group.

FIG. 5A is an example network diagram according to an embodiment of the present invention, illustrating if there are no or an insufficient number of available free resources in the coexistence band, then checking by the coexistence manager for availability of allocated but unused resources in the coexistence band, as advertised by one or more coexistence managers managing neighboring wireless networks in the network allocation group. As an example, the coexistence manager CM_1 102, receives from one or more coexistence managers CM_2 and CM_4 103 managing neighboring wireless networks, advertisements of an availability of allocated but unused resources in a coexistence band. CM_2 transmits in step [1] a resource advertisement, "12 WS slots allocated but not used for 802.11 networks", as shown in the spectrum diagram of FIG. 6A. CM_1 replies in step [2] with a reallocation command "WLAN AP STA1 takes eight WS slots for 802.11 network", as shown in the spectrum diagram of FIG. 6B.

FIG. 5B is an example network diagram according to an embodiment of the present invention, illustrating if there are no or an insufficient number of available free resources or not enough advertised allocated but unused resources in the coexistence band for the network allocation group, then analyzing by the coexistence manager an allocation of used resources in the coexistence band for neighboring wireless networks in the network allocation group, for which the coexistence enabler is eligible. As an example, in step [1] the coexistence manager CM_1 102 sends a query "Analyze Allocation Of WS Slots For WLAN 802.11 Neighbor Networks" to analyze allocations. In step [2] CM_2 then receives a resource status "Using 4 TVWS Slots For 802.11 STA3 in 802.11 Network 'A'" from coexistence manager CM_2, as shown in the spectrum diagram of FIG. 6C. In step [3] CM_1 then sends a reallocation command to CM_2 "WLAN AP STA1 Takes Two TVWS Slots For 802.11 Network", as shown in the spectrum diagram of FIG. 6D.

In example embodiments of the invention, coexistence managers may advertise the resource status information of the networks they serve and keep the neighboring networks aware of the availability of both allocated but unused resources in the coexistence band and used resources in the coexistence band. In this manner, a coexistence manager serving networks requiring resources may review the previously distributed advertisements of both allocated but unused resources in the coexistence band and used resources in the coexistence band and then proceed immediately to a reallocation command.

FIG. 5C is an example network diagram according to an embodiment of the present invention, illustrating if there are insufficient available resources and insufficient reallocatable used resources in the coexistence band for neighboring networks in the network allocation group, for which the coexistence enabler is eligible, then extending analysis by the coexistence manager to an allocation of used resources in the coexistence band for all neighboring wireless networks regardless of the network allocation group, i.e., both those networks within and outside of the same network allocation group, for which the coexistence enabler is eligible. As the result, reallocation commands may be issued to all the neighboring networks regardless of their network allocation group. As an example, in step [1] the coexistence manager CM_1 102 sends a query "Analyze Allocation Of WS Slots For All Neighbor Networks" to analyze allocations. In step [2] CM_2 then receives a resource status "No WS Slots For 802.11 Network" from coexistence manager CM_2. Also, CM_2 then receives a resource status "Using 4 TVWS Slots For WMAN 802.16 Base STA in WMAN Network 'D'" from coexistence manager CM_4, as shown in the spectrum diagram of FIG. 6E. In step [3] CM_1 then sends a reallocation command to CM_4 "WLAN AP STA1 Takes Two TVWS Slots From 802.16 WMAN Network 'D'", as shown in the spectrum diagram of FIG. 6F.

Figure 6A:
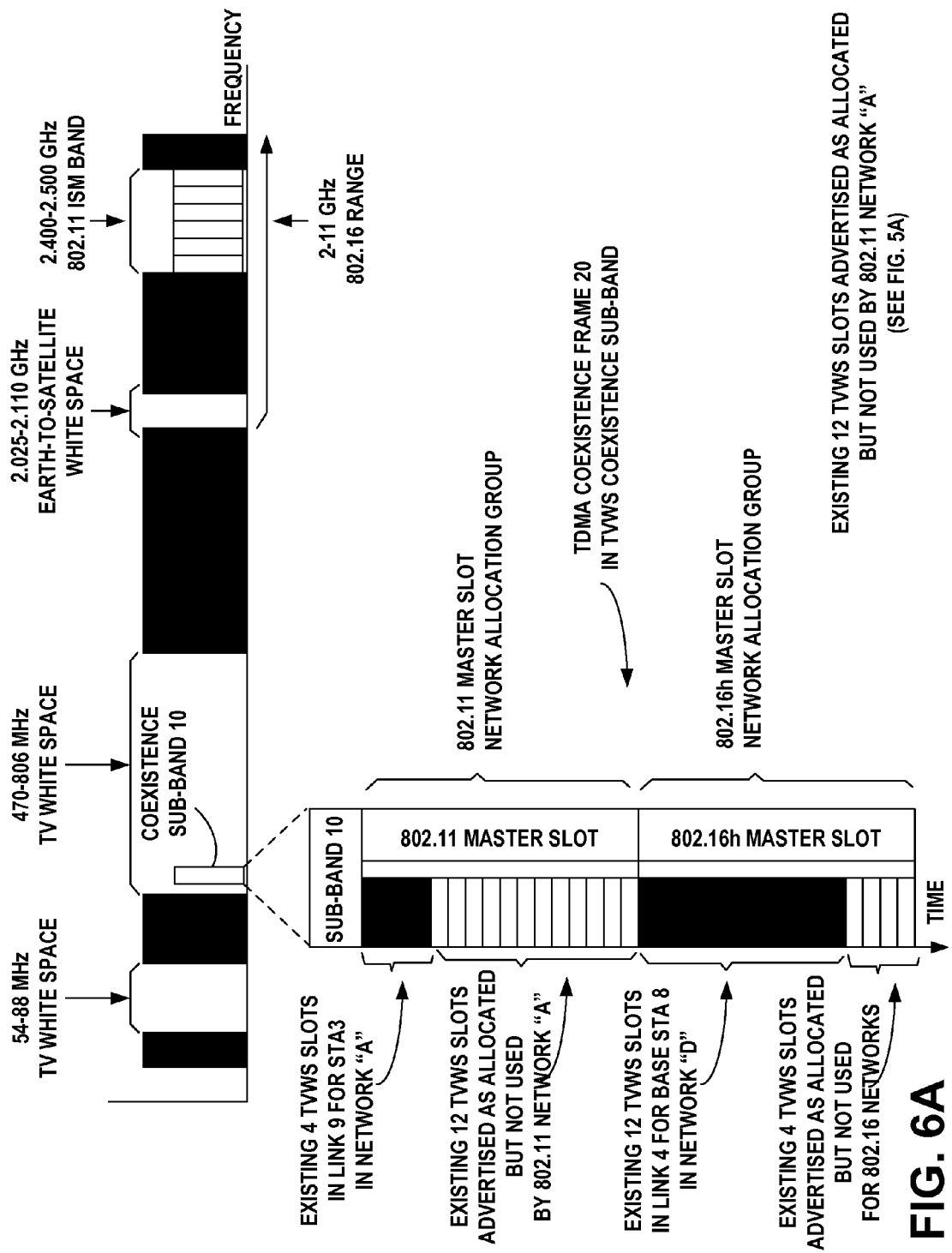
FIG. 6A is an example frequency band diagram illustrating a coexistence sub-band 10 in the TV white space band according to an embodiment of the present invention, illustrating an example of existing twelve TVWS slots advertised as allocated but not used by 802.11 network "A" (see FIG. 5A).

FIG. 6A is an example frequency band diagram illustrating a coexistence sub-band 10 in the TV white space band according to an embodiment of the present invention, illustrating an example of existing twelve TVWS slots advertised as allocated but not used by 802.11 network "A" (see FIG. 5A).

FIG. 6A illustrates the location of the TV white spaces and an example TDMA coexistence frame in the TV white space band, showing the occupancy of the time slots before the WLAN access point STA1 has any slots allocated to the TV white space band. The TV white spaces include 54-88 MHz band and 470-806 MHz band in the electromagnetic spectrum. Other locally unused white spaces may be present in certain geographic locations, such as frequency allocations from 2.025 GHz to 2.110 GHz for earth stations to transmit to communications satellites in areas remote from such earth stations. Also shown is the ISM band at 2.400-2500 GHz, in which the IEEE 802.11 signals are transmitted, for example in WLAN Network "B". For the wireless metropolitan area network (WMAN), the original version of the IEEE 802.16 standard specified a physical layer operating in the 10 to 66 GHz range. IEEE 802.16a, updated in 2004, added specifications for the 2 to 11 GHz range. For this example, example spectrum diagram shows the 2 to 11 GHz range, in which the IEEE 802.16 signals are transmitted, for example in WMAN Network "D".

There are a number of TVWS coexistence techniques possible for enabling two or more independently operated wireless networks or devices using different radio technologies adapted for TV white space frequency bands, to access the same TV white space frequency band in the same location without mutual interference. Some examples of coexistence techniques include dynamic frequency selection, transmit power control, listen-before-talk behavior, time division multiplexing different IEEE 802 technologies, message-based on-demand spectrum contention, and control through a centralized coexistence manager.

The example TVWS coexistence technique used here is to time division multiplexing different IEEE 802 technologies. The two IEEE 802 technologies chosen for this example are the IEEE 802.16h WMAN standard and the IEEE 802.11 WLAN standard. The IEEE 802.16h WMAN uses a fixed outdoor base station, such as the WMAN base station 8, serving indoor and outdoor portable clients, such as the WMAN STA 6. The IEEE 802.11 WLAN station, such as the WLAN access point STA1, may include Internet access and geo-location capability. The MAC 142 in the WLAN access point STA1 includes integrated TV white space features to communicate with the radio 128 in channels in the TV white spaces band reallocated by the coexistence manager 102, without mutual interference. The IEEE 802.16h WMAN STA 6, for example, may also include a MAC with integrated TV white space features to communicate using a radio in frequency sub-bands in the TV white spaces band reallocated by the coexistence manager 102, without mutual interference.

The spectrum diagram of FIG. 6A shows the TDMA coexistence frame 20 in TVWS coexistence sub-band. The 802.11 master slot network allocation group includes existing 4 TVWS slots in link 9 for STA3 in network "A" and existing 12 TVWS slots advertised as allocated but not used by 802.11 network "A". The 802.16h master slot network allocation group includes existing 12 TVWS slots in link 4 for base STA8 in network "D" and existing 4 TVWS slots advertised as allocated but not used for 802.16 networks.

Figure 6B:
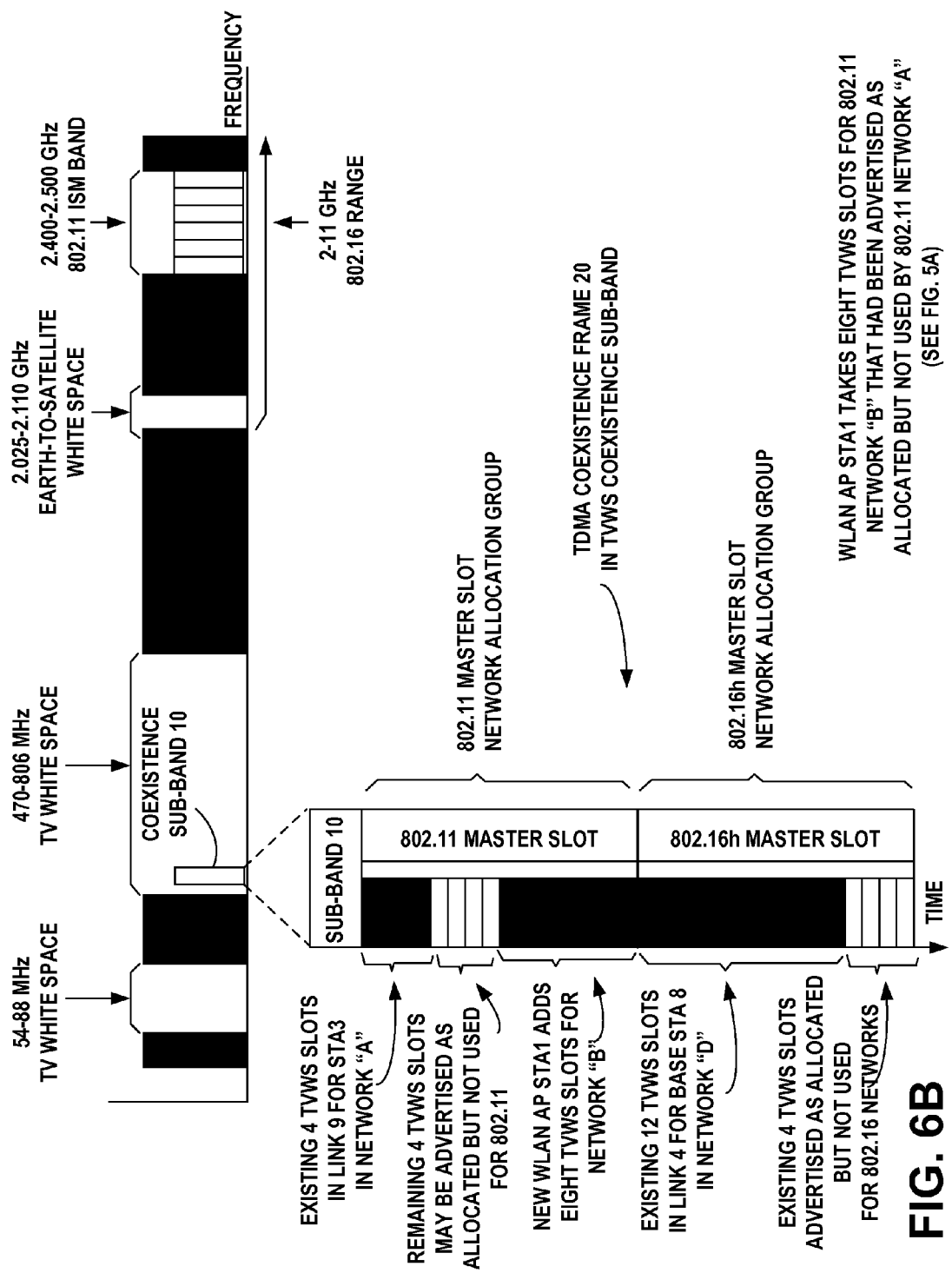
FIG. 6B is an example frequency band diagram illustrating a coexistence sub-band 10 in the TV white space band according to an embodiment of the present invention, illustrating an example of WLAN AP STA1 taking eight TVWS slots for 802.11 network "B" that had been advertised as allocated but not used by 802.11 network "A" (see FIG. 5A).

FIG. 6B is an example frequency band diagram illustrating a coexistence sub-band 10 in the TV white space band according to an embodiment of the present invention, illustrating WLAN AP STA1 takes eight TVWS slots for 802.11 network "B" that had been advertised as allocated but not used by 802.11 network "A" (See FIG. 5A).

A light reallocation typically is available in the following circumstances:
1. When a secondary network has need for more resources.
2. When a secondary network is releasing resources.

Figure 6C:
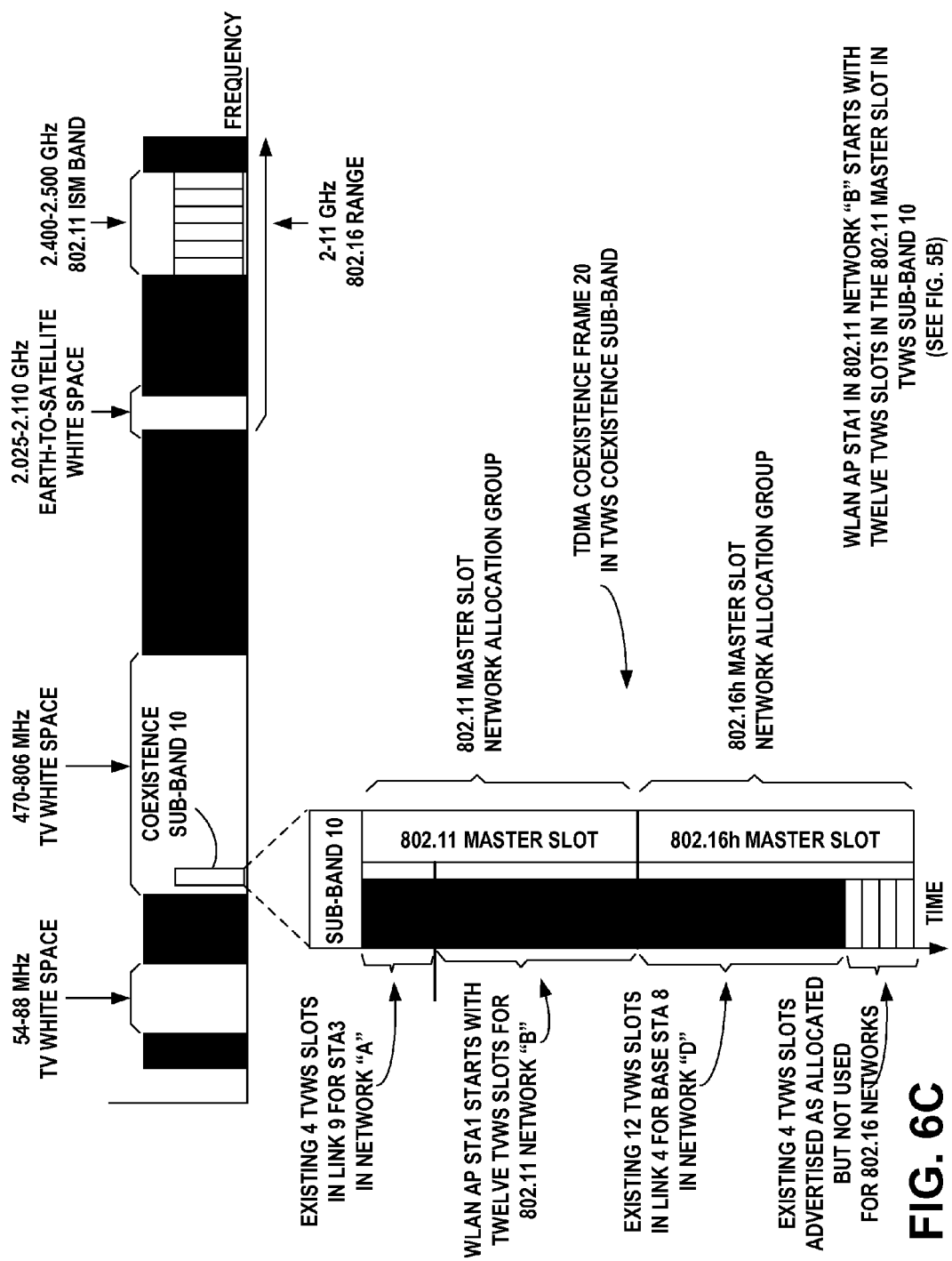
FIG. 6C is an example frequency band diagram illustrating a coexistence sub-band 10 in the TV white space band according to an embodiment of the present invention, illustrating an example of WLAN AP STA1 in 802.11 network "B", which starts with twelve TVWS slots in the 802.11 master slot in TVWS sub-band 10 (see FIG. 5B).

FIG. 6C is an example frequency band diagram illustrating a coexistence sub-band 10 in the TV white space band according to an embodiment of the present invention, illustrating WLAN AP STA1 in 802.11 network "B" starts with twelve TVWS slots in the 802.11 master slot in TVWS sub-band 10. (See FIG. 5B)

Figure 6D:
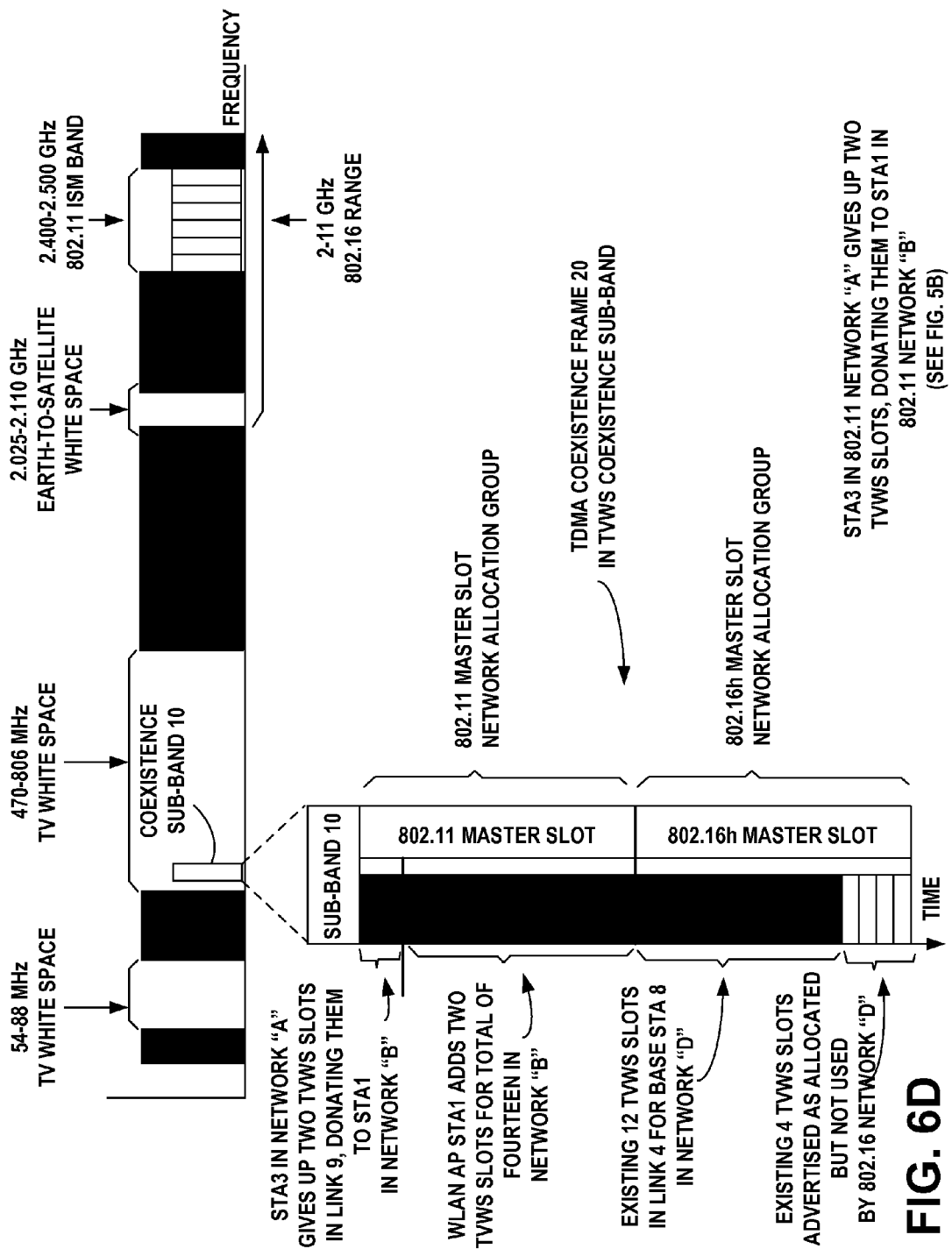
FIG. 6D is an example frequency band diagram illustrating a coexistence sub-band 10 in the TV white space band according to an embodiment of the present invention, illustrating an example of STA3 in 802.11 network "A" giving up two TVWS slots, donating them to STA1 in 802.11 network "B" (see FIG. 5B).

FIG. 6D is an example frequency band diagram illustrating a coexistence sub-band 10 in the TV white space band according to an embodiment of the present invention, illustrating STA3 in 802.11 network "A" gives up two TVWS slots, donating them to STA1 in 802.11 network "B". (See FIG. 5B)

Figure 6E:
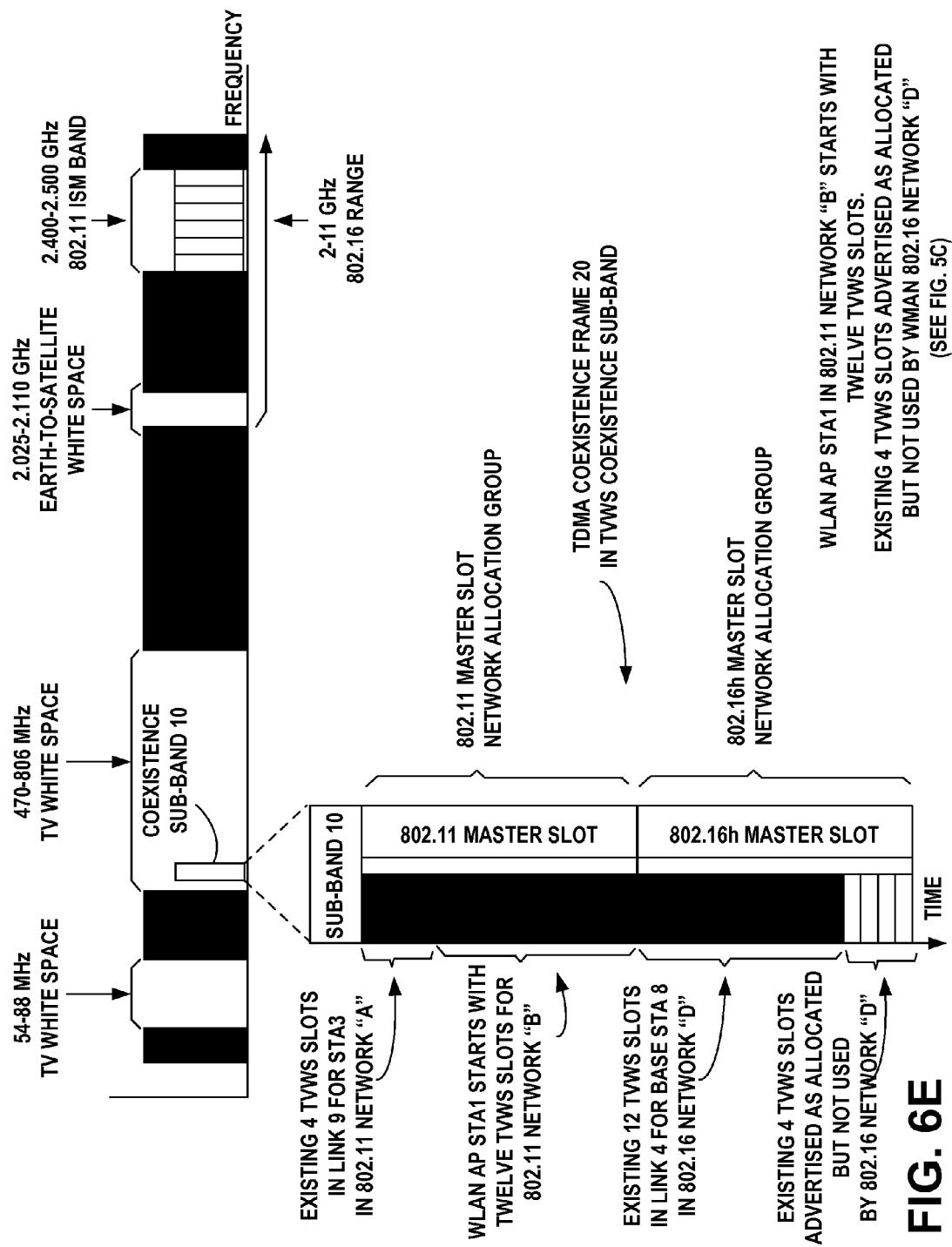
FIG. 6E is an example frequency band diagram illustrating a coexistence sub-band 10 in the TV white space band according to an embodiment of the present invention, illustrating an example of WLAN AP STA1 in 802.11 network "B" starting

FIG. 6E is an example frequency band diagram illustrating a coexistence sub-band 10 in the TV white space band according to an embodiment of the present invention, illustrating WLAN AP STA1 in 802.11 network "B" starts with twelve TVWS slots existing 4 TVWS slots advertised as allocated but not used by WMAN 802.16 network "D" (See FIG. 5C)

Figure 6F:
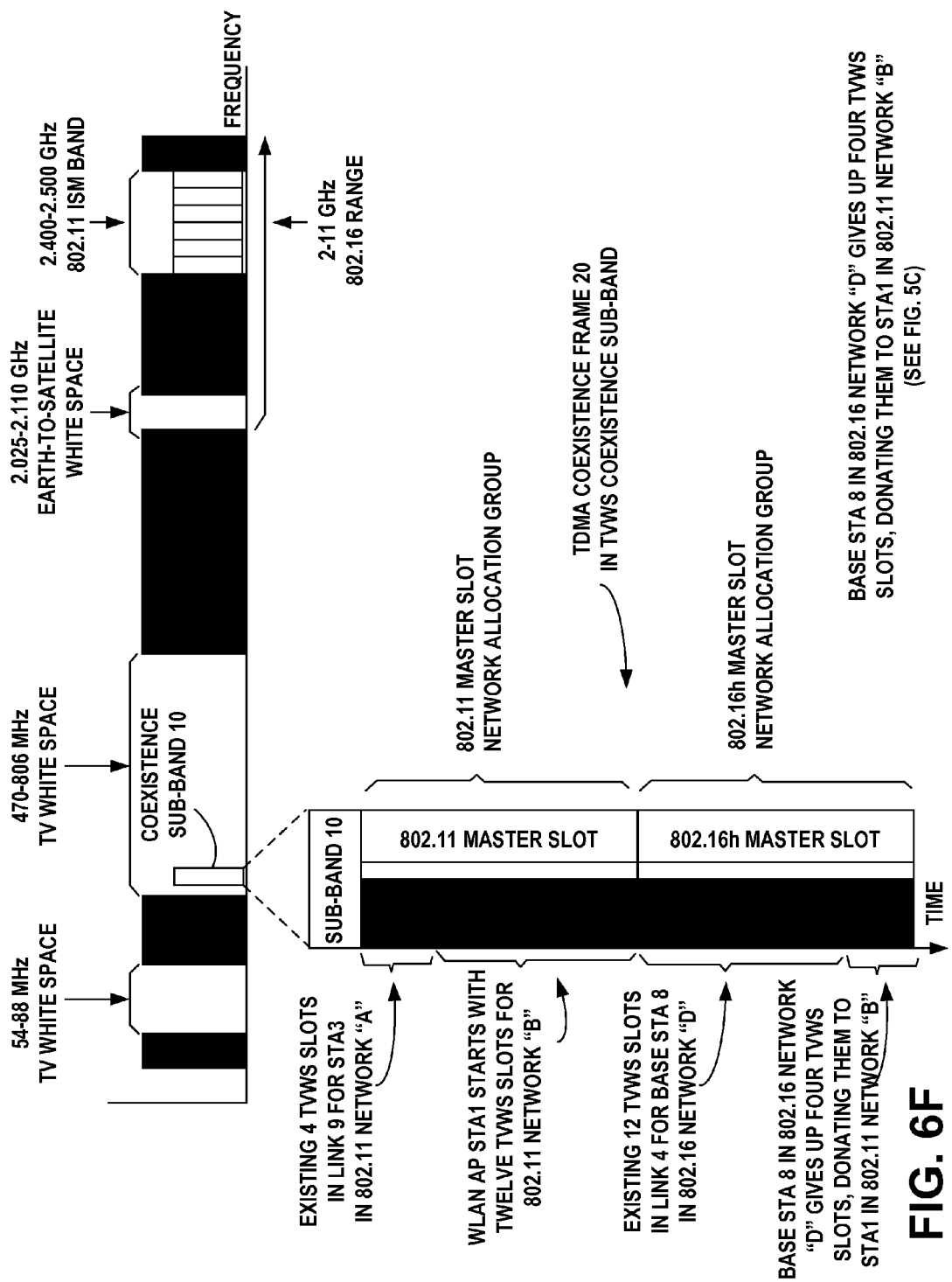
FIG. 6F is an example frequency band diagram illustrating a coexistence sub-band 10 in the TV white space band according to an embodiment of the present invention, illustrating an example of base STA8 in 802.16 network "D" giving up four TVWS slots, donating them to STA1 in 802.11 network "B" (see FIG. 5C).

FIG. 6F is an example frequency band diagram illustrating a coexistence sub-band 10 in the TV white space band according to an embodiment of the present invention, illustrating base STA 8 in 802.16 network "D" gives up four TVWS slots, donating them to STA1 in 802.11 network "B" (See FIG. 5C)

A more extensive reallocation is typically required in the following circumstances:
1. When a primary user (existing licensed uses, for example, licensed TV broadcaster, etc.) has appeared in a channel currently available for secondary usage, either occupied at the moment by a secondary network or the primary has evacuated a channel.
2. When a new secondary network has entered the area.
3. When interference level by some cause has raised to intolerable level.
4. When a new channel is found available for secondary usage.
5. When a secondary network in the area has closed its operation.

Figure 6G:
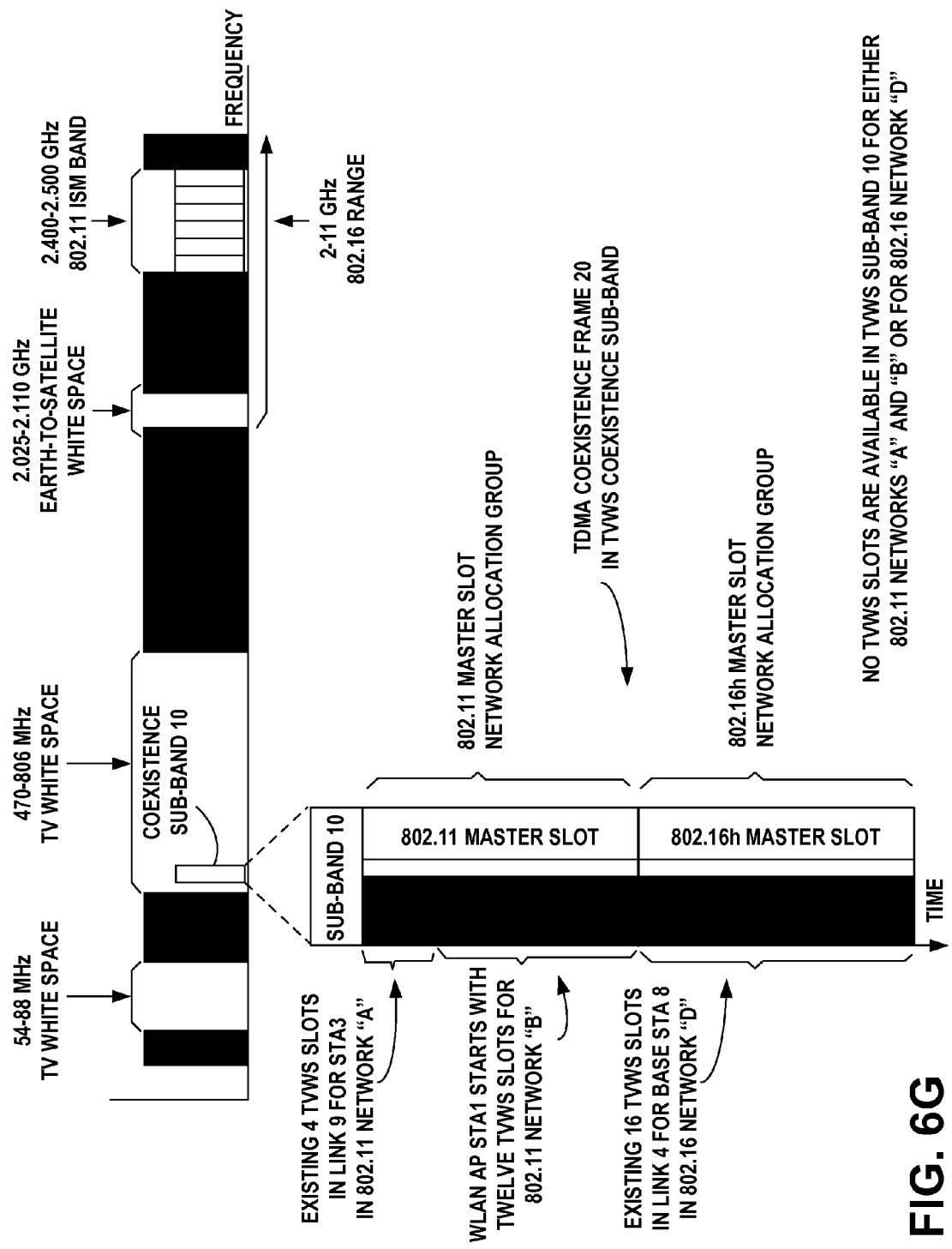
FIG. 6G is an example frequency band diagram illustrating a coexistence sub-band 10 in the TV white space band according to an embodiment of the present invention, illustrating an example of no TVWS slots being available in TVWS sub-band 10 for either 802.11 networks "A" and "B" or for 802.16 network "D".

FIG. 6G is an example frequency band diagram illustrating a coexistence sub-band 10 in the TV white space band according to an embodiment of the present invention, illustrating no TVWS slots are available in TVWS sub-band 10 for either 802.11 networks "A" AND "B" or for 802.16 network "D".

Figure 6H:
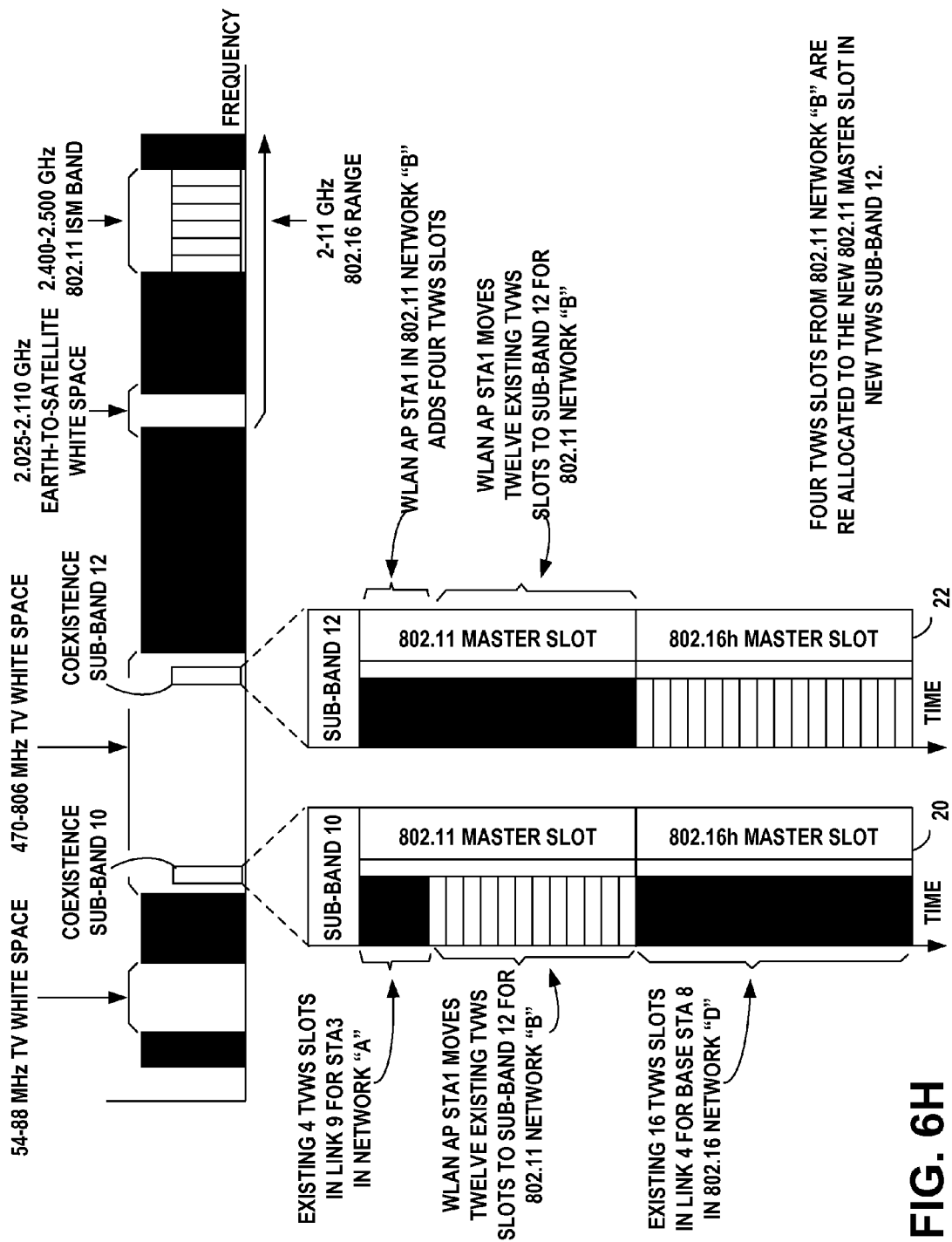
FIG. 6H is an example frequency band diagram illustrating two coexistence sub-bands 10 and 2 in the TV white space band according to an embodiment of the present invention, illustrating an example of four TVWS slots from 802.11 network "B" being re allocated to the new 802.11 master slot in new TVWS sub-band 12.

FIG. 6H is an example frequency band diagram illustrating two coexistence sub-bands 10 and 2 in the TV white space band according to an embodiment of the present invention, illustrating four TVWS slots from 802.11 network "B" are reallocated to the new 802.11 master slot in new TVWS sub-band 12.

Figure 7:
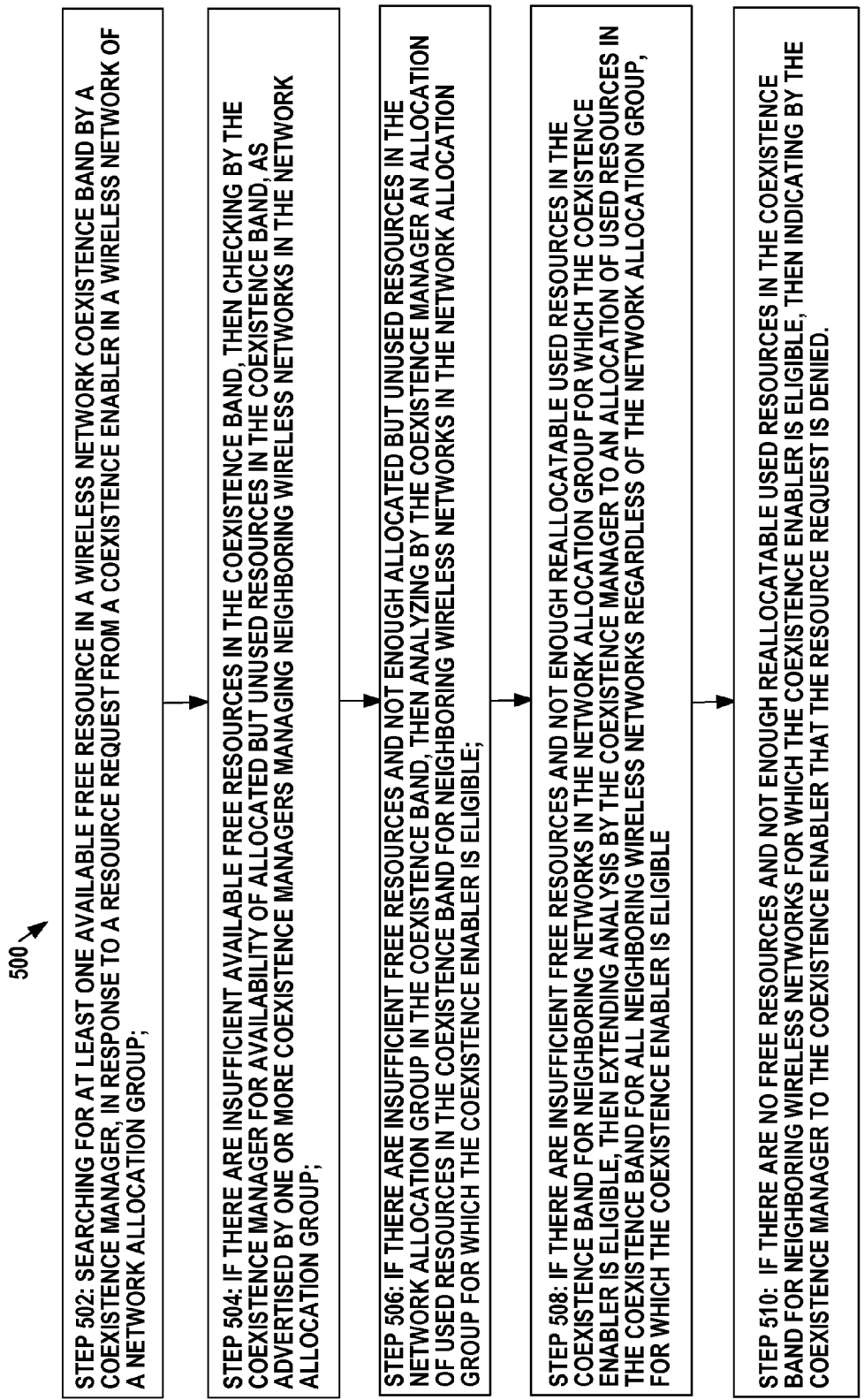
FIG. 7 is an example flow diagram of operational steps in a resource request process, according to an embodiment of the present invention.

FIG. 7 is an example flow diagram 500 of operational steps in a resource request process, according to an embodiment of the present invention, with example steps as follows:

Step 502: searching for at least one available free resource in a wireless network coexistence band by a coexistence manager, in response to a resource request from a coexistence enabler in a wireless network of a network allocation group;

Step 504: if there are no available free resources in the coexistence band, then checking by the coexistence manager for availability of allocated but unused resources in the coexistence band, as advertised by one or more coexistence managers managing neighboring wireless networks in the network allocation group;

Step 506: if there are insufficient free resources and not enough allocated but unused resources in the network allocation group in the coexistence band, then analyzing by the coexistence manager an allocation of used resources in the coexistence band for neighboring wireless networks in the network allocation group for which the coexistence enabler is eligible;

Step 508: if there are insufficient free resources and not enough reallocatable used resources in the coexistence band for neighboring networks in the network allocation group for which the coexistence enabler is eligible, then extending analysis by the coexistence manager to an allocation of used resources in the coexistence band for all neighboring wireless networks regardless of the network allocation group, for which the coexistence enabler is eligible; and Step 510: if there are no free resources and not enough reallocatable used resources in the coexistence band for neighboring wireless networks for which the coexistence enabler is eligible, then indicating by the coexistence manager to the coexistence enabler that the resource request is denied.

The steps of the flow diagram 500 of FIG. 7 represent computer code instructions stored in the RAM and/or ROM memory of the WLAN access point STA1 and the coexistence manager 102, which when executed by the central processing units (CPU), carry out the functions of the example embodiments of the invention. The steps may be carried out in another order than shown and individual steps may be combined or separated into component steps.

The update of a spectrum map is an independent process, which keeps relevant information of channel usage up to date in each coexistence manager of secondary network(s). Each network has its own spectrum map, which spectrum channel usage information is gathered via spectrum sensing, communication with local secondary neighbors and from primary database.

FIG. 8, consisting of FIGS. 8A and 8B, is an example flow diagram 600 of operational steps in processing the resource request, according to an embodiment of the present invention, the steps comprising:

Steps 602 to 608 in FIG. 8A are performed by Coexistence Enabler (CE):
  Step 602: Process Header: Resource Allocation Process.
  Step 604: Start: Resource Check.
  Step 606: Process: Coexistence Enabler (CE) Identifies Excess Lack of Resources.
  Step 608: Subroutine: Send Resource Request to Coexistence Manager (CM)

Steps 630 to 648 in FIG. 8B are performed by Coexistence Manager (CM):
  Step 630: Subroutine: Environment Analysis
  Step 632: Decision: Any Free Channels?
  Step 634: Subroutine: Yes/Inform Neighbor Networks/Send command to CE
  Step 636: Subroutine: No/Current Advertised Channels Analysis
  Step 638: Decision: Suitable Advertised Allocated But Unused Resources?
  Step 640: Subroutine: Yes/Communication with Relevant Networks/Command to CE
  Step 642: Subroutine: No/Environment Change and Allocation Analysis
  Step 644: Decision: Eligible To New Resources?
  Step 646: Subroutine: Yes/Communicate Schedule To Relevant Neighbor Networks/Send command to CE
  Step 648: Denial of request/Send command to CE The FIGS. 8A and 8B show the flow of a resource request. A coexistence enabler may operate in a single network or it may share the allocation changes with some real neighbors in the same network allocation group (NAG). The coexistence enabler waits for a stimulus in its resource check state. Normally small allocation changes are done by self-coexistence methods of that particular standard or by cross-coexistence methods of standards sharing the channel.

In Step 604 in FIG. 8A, for example, the coexistence enabler (CE) 100 continually monitors the ambient RF spectrum. It uses the spectrum sensing strategy sent to it by the coexistence manager (CM) 102 to examine the local RF spectrum for the presence of incumbent, primary users in coexistence bands that, if unused, may be available in the local geographic area, such as any TV broadcaster's signal in the local TV white space band, any maritime radio signal in the local maritime radio band, or any earth station radio signal in the local satellite earth station radio band. These spectrum sensing results are sent to the coexistence manager (CM) 102. The coexistence enabler (CE) 100 continually monitors the traffic handled by STA1's network "B" link and compares it with thresholds for required quality of service (QoS), channel interference, frequency of retransmissions, and the like. When it identifies a need for additional resources in step 606 in order to meet the required thresholds, it sends a resource request to coexistence manager (CM) in step 608.

In Step 630 in FIG. 8B, for example, the coexistence manager (CM) 102 accesses the primary database 104 to obtain the identity of locally free secondary channels in the local TV white space band, the local maritime radio white space band, and the local satellite earth station radio white space band. If step 632 determines that there are locally free secondary channels, then in step 634, it sends a command to the coexistence enabler (CE) 100 to reallocate some of its existing 802.11 channels in its network "B" link to locally free secondary channels in TVWS band link 3, which the coexistence manager (CM) 102 specifies. The coexistence manager (CM) 102 may also send an update to the primary database 104 that the specified secondary channels in the white space have been allocated to the coexistence enabler (CE) 100. The coexistence enabler (CE) 100 will check the ambient RF spectrum again to confirm that no primary user signals have appeared, and then. it will reconfigure the MAC in STA1 to move some of its existing 802.11 channels to the specified locally free secondary channels in TVWS link 3. It also causes STA1 to send a command over its existing network "B" link to the client device, STA2, to make a corresponding move of some of its existing 802.11 channels to the specified locally free secondary channels in TVWS link 3.

If there are no or an insufficient number of available free resources in the coexistence band, then in Step 636 in FIG. 8B, for example, the coexistence manager (CM) 102 checks for the availability of allocated but unused resources in the coexistence band, as advertised by one or more coexistence managers managing neighboring wireless networks in the network allocation group. As an example, the coexistence manager 102, receives over the Internet from one or more other coexistence managers 102" managing neighboring wireless networks, advertisements of an availability of allocated but unused resources in a coexistence band. In step 638, if there are suitable advertised allocated but unused channels, then in Step 640 coexistence manager 102 communicates with the other coexistence manager 102" negotiating for the specified advertised allocated but unused channels in the white space to be reallocated to the coexistence enabler (CE) 100. The coexistence manager (CM) 102 then sends a command to the coexistence enabler (CE) 100 to reallocate some of its existing 802.11 channels in its network "B" link to the advertised allocated but unused channels in TVWS band link 3, which the coexistence manager (CM) 102 specifies. The coexistence enabler (CE) 100 will check the ambient RF spectrum again to confirm that no primary user signals have appeared, and then. it will reconfigure the MAC in STA1 to move some of its existing 802.11 channels to the specified advertised allocated but unused channels in TVWS link 3. It also causes STA1 to send a command over its existing network "B" link to the client device, STA2, to make a corresponding move of some of its existing 802.11 channels to the specified advertised allocated but unused channels in TVWS link 3.

If there are no or an insufficient number of available free resources (for example, channels) or not enough advertised allocated but unused resources (for example, channels) in the coexistence band for the network allocation group, then in Step 642 in FIG. 8B, for example, the coexistence manager (CM) 102 analyzes an allocation of used resources (for example, channels) in the coexistence band for neighboring wireless networks in the network allocation group, for which the coexistence enabler 100 is eligible. The coexistence manager 102 sends a query over the Internet to coexistence managers managing neighboring wireless networks in the same network allocation group, to analyze allocations if it doesn't already have up to date information about the allocations and environment. The coexistence manager 102 then receives a resource status report from one or more coexistence managers managing neighboring wireless networks in the same network allocation group. The coexistence manager 102 will check the eligibility of the coexistence enabler 100 to the proposed resource allocation change. Factors determining the eligibility of coexistence enabler 100 for the proposed reallocation may include relative QoS of the proposed donating network and the requesting network, relative priority of the traffic of the proposed donating network and the requesting network, and the like. In step 646, if there are eligible new resources, then in Step 646 coexistence manager 102 communicates with the other coexistence manager 102" negotiating for the reallocation of the used resources in the white space to be reallocated to the coexistence enabler (CE) 100. The coexistence manager (CM) 102 then sends a command to the coexistence enabler (CE) 100 to reallocate some of its existing 802.11 channels in its network "B" link to the used resources in TVWS band link 3, which the coexistence manager (CM) 102 specifies. The coexistence manager (CM) 102 may also send an update to the primary database 104 that the specified used resources in the white space have been reallocated to the coexistence enabler (CE) 100. The coexistence enabler (CE) 100 will check the ambient RF spectrum again to confirm that no primary user signals have appeared, and then. it will reconfigure the MAC in STA1 to move some of its existing 802.11 channels to the specified used resources (channels) in TVWS link 3. It also causes STA1 to send a command over its existing network "B" link to the client device, STA2, to make a corresponding move of some of its existing 802.11 channels to the specified used resources (channels) in TVWS link 3.

If there are insufficient available resources and insufficient reallocatable used resources in the coexistence band for neighboring networks in the network allocation group for which the coexistence enabler is eligible, then in Step 642 in FIG. 8B, for example, the coexistence manager (CM) 102 extends analysis to an allocation of used resources in the coexistence band for all neighboring wireless networks regardless of the network allocation group, for which the coexistence enabler is eligible. The coexistence manager 102 sends a query over the Internet to coexistence managers managing neighboring wireless networks in all network allocation groups, to analyze allocations if it doesn't already have up to date information about the allocations and environment. The coexistence manager 102 then receives a resource status report from one or more coexistence managers 103 managing neighboring wireless networks in any network allocation group. The coexistence manager 102 will check the eligibility of the coexistence enabler 100 to the proposed resource allocation change. Factors determining the eligibility of coexistence enabler 100 for the proposed reallocation may include relative QoS of the proposed donating network and the requesting network, relative priority of the traffic of the proposed donating network and the requesting network, relative sensitivity to interference, and the like. In step 646, if there are eligible new resources in any network allocation group, then in Step 646 coexistence manager 102 communicates with the other coexistence manager 103 negotiating for the reallocation of the used resources in the white space to be reallocated to the coexistence enabler (CE) 100. The coexistence manager (CM) 102 then sends a command to the coexistence enabler (CE) 100 to reallocate some of its existing 802.11 channels in its network "B" link to the used resources in TVWS band link 3, which the coexistence manager (CM) 102 specifies. The coexistence manager (CM) 102 may also send an update to the primary database 104 that the specified used resources in the white space have been reallocated to the coexistence enabler (CE) 100. The coexistence enabler (CE) 100 will check the ambient RF spectrum again to confirm that no primary user signals have appeared, and then. it will reconfigure the MAC in STA1 to move some of its existing 802.11 channels to the specified used resources (channels) in TVWS link 3. It also causes STA1 to send a command over its existing network "B" link to the client device, STA2, to make a corresponding move of some of its existing 802.11 channels to the specified used resources (channels) in TVWS link 3.

If there are no available resources and no reallocatable used resources in the coexistence band for neighboring wireless networks, in step 648 in FIG. 8B, for example, coexistence manager (CM) 102 indicates to the coexistence enabler 100 that the resource request is denied.

The steps of the flow diagram of FIG. 8 represent computer code instructions stored in the RAM and/or ROM memory of the WLAN access point STA1 and the coexistence manager 102, which when executed by the central processing units (CPU), carry out the functions of the example embodiments of the invention. The steps may be carried out in another order than shown and individual steps may be combined or separated into component steps.

The coexistence enabler sends a resource request to its coexistence manager when the current allocation with current bandwidth or a possible coexistence method does not satisfy the needs. The coexistence manager will check the eligibility to resource allocation change.

A network allocation group (NAG) is a group of neighboring networks that is typically a sub-set of all the neighboring networks. In a NAG, networks have typically some common denominator that can be, for example, a common set of properties.

Analysis done by any alternative is based on the spectrum maps and current allocations of each network, Network parameters of each network and capabilities of each network.

The communication between secondary networks may be done directly over the air or indirectly via a wired backbone.

Using the description provided herein, the embodiments may be implemented as a machine, process, or article of manufacture by using standard programming and/or engineering techniques to produce programming software, firmware, hardware or any combination thereof.

Any resulting program(s), having computer-readable program code, may be embodied on one or more computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that exists permanently or temporarily on any computer-usable medium or in any transmitting medium which transmits such a program.

As indicated above, memory/storage devices include, but are not limited to, disks, optical disks, removable memory devices such as smart cards, SIMs, WIMs, semiconductor memories such as RAM, ROM, PROMS, etc. Transmitting mediums include, but are not limited to, transmissions via wireless communication networks, the Internet, intranets, telephone/modem-based network communication, hard-wired/cabled communication network, satellite communication, and other stationary or mobile network systems/communication links.

Although specific example embodiments have been disclosed, a person skilled in the art will understand that changes can be made to the specific example embodiments without departing from the spirit and scope of the invention.

What is claimed is:

1. A method, comprising:
   searching for at least one available free resource in a wireless network coexistence band by a coexistence manager, in response to a resource request from a coexistence enabler in a wireless network;
   when there are insufficient available free resources in the coexistence band, then checking by the coexistence manager for availability of allocated but unused resources in the coexistence band, as advertised by one or more coexistence managers managing neighboring wireless networks in a network allocation group of the coexistence enabler; and
   when there are insufficient available free resources or not enough advertised allocated but unused resources in the coexistence band for the network allocation group, then analyzing by the coexistence manager resources and resource needs in the coexistence band for the neighboring wireless networks.

2. The method of claim 1, wherein the step of searching further comprises:
   when the at least one available free resource is found in the coexistence band, then informing the one or more coexistence managers managing neighboring wireless networks of a new resource usage.

3. The method of claim 1, wherein the step of checking further comprises:
   when there are enough allocated but unused resources available, then agreeing with the one or more coexistence managers managing the neighboring wireless networks to reassign one or more of the available allocated but unused resources in the coexistence band to the coexistence enabler.

4. The method of claim 1, wherein the step of analyzing further comprises:
   when the resources or the resource needs have not changed substantially, then making by the coexistence manager a reallocation of used resources in the coexistence band for neighboring wireless networks in the network allocation group.

5. The method of claim 4, wherein a substantial change of resources comprises at least one frequency band becoming available or unavailable.

6. The method of claim 4, wherein a substantial change of resource needs comprises an increase or decrease of at least one neighboring network.

7. The method of claim 1, wherein the step of analyzing further comprises:
   when the resources or the resource needs have changed, then making by the coexistence manager a reallocation of all available resources in the coexistence band for the neighboring wireless networks.

8. The method of claim 7, wherein the change of resources comprises at least one frequency band becoming available or unavailable.

9. The method of claim 7, wherein the change of resource needs comprises an increase or decrease of at least one neighboring network.

10. The method of claim 1, wherein the step of analyzing further comprises:
    when there are no available resources and no reallocatable used resources in the coexistence band for neighboring wireless networks, then indicating by the coexistence manager to the coexistence enabler that the resource request is denied.

11. The method of claim 1, wherein:
    when there are reallocatable used resources in the coexistence band for neighboring wireless networks that are in the network allocation group, then agreeing with the one or more coexistence managers managing neighboring wireless networks in the same network allocation group, to reassign one or more of the reallocatable used resources to the coexistence enabler, when the coexistence enabler is eligible for the reallocatable used resources for networks in the same network allocation group.

12. The method of claim 11, wherein:
    when there are no available resources and no reallocatable used resources in the coexistence band for neighboring wireless networks, then indicating by the coexistence manager to the coexistence enabler that the resource request is denied.

13. The method of claim 1, wherein:
    when there are reallocatable used resources in the coexistence band for neighboring wireless networks that are not in the same network allocation group, then agreeing with all of the coexistence managers managing neighboring wireless networks, to reassign one or more of the reallocatable used resources to the coexistence enabler and communicating with all of the coexistence managers managing neighboring wireless networks, when the coexistence enabler is eligible for the reallocatable used resources of all of the neighboring wireless networks.

14. The method of claim 13, wherein:
    when there are no available resources and no reallocatable used resources in the coexistence band for neighboring wireless networks, then indicating by the coexistence manager to the coexistence enabler that the resource request is denied.

15. An apparatus, comprising:
    at least one processor;
    at least one memory including computer program code;
    the at least one memory and the computer program code configured to, with the at least one processor, cause the coexistence manager at least to:
    search for at least one available free resource in a wireless network coexistence band by a coexistence manager, in response to a resource request from a coexistence enabler in a wireless network;
    when there are insufficient available free resources in the coexistence band, then check by the coexistence manager for availability of allocated but unused resources in the coexistence band, as advertised by one or more coexistence managers managing neighboring wireless networks in a network allocation group of the coexistence enabler; and
    when there are insufficient available free resources or not enough advertised allocated but unused resources in the coexistence band for the network allocation group, then analyze by the coexistence manager resources and resource needs in the coexistence band for the neighboring wireless networks.

16. The apparatus of claim 15, wherein the step of searching further comprises:
    the at least one memory and the computer program code configured to, with the at least one processor, cause the coexistence manager at least to:
    when the at least one available free resource is found in the coexistence band, then inform the one or more coexistence managers managing the neighboring wireless networks of a new resource usage.

17. The apparatus of claim 15, wherein the step of checking further comprises:
the at least one memory and the computer program code configured to, with the at least one processor, cause the coexistence manager at least to:
when there are allocated but unused resources available, then agree with the one or more coexistence managers managing the neighboring wireless networks to reassign one or more of the available allocated but unused resources in the coexistence band to the coexistence enabler.

18. The apparatus of claim 15, wherein the step of analyzing further comprises:
the at least one memory and the computer program code configured to, with the at least one processor, cause the coexistence manager at least to:
when the resources or the resource needs have not changed substantially, then make by the coexistence manager a reallocation of used resources in the coexistence band for the neighboring wireless networks in the network allocation group.

19. The apparatus of claim 18, wherein a substantial change of resources comprises at least one frequency band becoming unavailable.

20. The apparatus of claim 18, wherein a substantial change of resource needs comprises an increase of at least one neighboring network.

21. The apparatus of claim 15, wherein the step of analyzing further comprises:
the at least one memory and the computer program code configured to, with the at least one processor, cause the coexistence manager at least to:
when the resources or the resource needs have changed, then make by the coexistence manager a reallocation of all available resources in the coexistence band for the neighboring wireless networks.

22. The apparatus of claim 21, wherein the change of resources comprises at least one frequency band becoming unavailable.

23. The apparatus of claim 21, wherein the change of resource needs comprises an increase of at least one neighboring network.

24. The apparatus of claim 15, wherein the step of analyzing further comprises:
the at least one memory and the computer program code configured to, with the at least one processor, cause the coexistence manager at least to:
when there are no available resources and no reallocatable used resources in the coexistence band for the neighboring wireless networks, then indicate by the coexistence manager to the coexistence enabler that the resource request is denied.

25. The apparatus of claim 15, wherein:
the at least one memory and the computer program code configured to, with the at least one processor, cause the coexistence manager at least to:
when there are reallocatable used resources in the coexistence band for the neighboring wireless networks that are in the network allocation group, then agree with the one or more coexistence managers managing the neighboring wireless networks in the same network allocation group, to reassign one or more of the reallocatable used resources to the coexistence enabler, when the coexistence enabler is eligible for the reallocatable used resources for networks in the same network allocation group.

26. The apparatus of claim 25, wherein:
the at least one memory and the computer program code configured to, with the at least one processor, cause the coexistence manager at least to:
when there are no available resources and no reallocatable used resources in the coexistence band for the neighboring wireless networks, then indicate by the coexistence manager to the coexistence enabler that the resource request is denied.

27. The apparatus of claim 15, wherein:
the at least one memory and the computer program code configured to, with the at least one processor, cause the coexistence manager at least to:
when there are reallocatable used resources in the coexistence band for the neighboring wireless networks that are not in the same network allocation group, then agree with all of the coexistence managers managing the neighboring wireless networks, to reassign one or more of the reallocatable used resources to the coexistence enabler and communicate with all of the coexistence managers managing the neighboring wireless networks, when the coexistence enabler is eligible for the reallocatable used resources of all of the neighboring wireless networks.

28. The apparatus of claim 27, wherein:
the at least one memory and the computer program code configured to, with the at least one processor, cause the coexistence manager at least to:
when there are no available resources and no reallocatable used resources in the coexistence band for the neighboring wireless networks, then indicate by the coexistence manager to the coexistence enabler that the resource request is denied.

29. The apparatus of claim 15, wherein the coexistence band is in a TV white space frequency band or in another RF spectrum white space band wherein there are no primary user radios operating in the neighboring wireless networks.

30. A non-transitory computer readable medium storing program instructions, which when executed by a computer processor, perform the steps comprising:
searching for at least one available free resource in a wireless network coexistence band by a coexistence manager, in response to a resource request from a coexistence enabler in a wireless network;
when there are insufficient available free resources in the coexistence band, then checking by the coexistence manager for availability of allocated but unused resources in the coexistence band, as advertised by one or more coexistence managers managing neighboring wireless networks in a network allocation group of the coexistence enabler; and
when there are insufficient available free resources or not enough advertised allocated but unused resources in the coexistence band for the network allocation group, then analyzing by the coexistence manager resources and resource needs in the coexistence band for the neighboring wireless networks.

* * * * *